US012638546B1

(12) United States Patent
Hong et al.

(10) Patent No.: US 12,638,546 B1
(45) Date of Patent: May 26, 2026

(54) AMBIGUITY RESOLUTION ACROSS MULTIPLE RADAR MEASUREMENT DOMAINS

(71) Applicant: Oculii Corp., Beavercreek, OH (US)

(72) Inventors: Lang Hong, Beavercreek, OH (US);
Steven Hong, Xenia, OH (US); **Kiran
Vaidyanathan**, Beavercreek, OH (US);
Kranthi Kumar Madhavaram, West
Carrollton, OH (US)

(73) Assignee: Oculii Corp., Beavercreek, OH (US)

( * ) Notice: Subject to any disclaimer, the term of this
patent is extended or adjusted under 35
U.S.C. 154(b) by 244 days.

(21) Appl. No.: 18/511,719

(22) Filed: Nov. 16, 2023

Related U.S. Application Data

(63) Continuation-in-part of application No. 18/140,958,
filed on Apr. 28, 2023, which is a continuation-in-part
of application No. 18/129,834, filed on Apr. 1, 2023.

(51) Int. Cl.
*G01S 7/40* (2006.01)
*G01S 7/41* (2006.01)

(52) U.S. Cl.
CPC . *G01S 7/40* (2013.01); *G01S 7/41* (2013.01)

(58) Field of Classification Search
None
See application file for complete search history.

(56) References Cited

U.S. PATENT DOCUMENTS

2022/0066012 A1 * 3/2022 Jansen .................... H04B 1/18

* cited by examiner

*Primary Examiner* — Whitney Moore
(74) *Attorney, Agent, or Firm* — Maiorana Patent Law,
PA

(57) ABSTRACT

An apparatus comprising an interface and a processor. The
interface may be configured to present a probe signal and
receive raw radar data generated in response to a reflection
of the probe signal. The processor may be configured to
generate a plurality of profile configurations, interleave the
plurality of profile configurations into the probe signal, and
reconstruct a radar output based on the plurality of profile
configurations in response to the raw radar data. Interleaving
the profile configurations into the probe signal may enable
the raw radar data to be received comprising information
about an environment corresponding to each of the profile
configurations at one time frame. Interleaving the profile
configurations may enable the processor to extract the
information about the environment corresponding to each of
the profile configurations independent from each other. The
radar output may comprise the information about the envi-
ronment.

20 Claims, 12 Drawing Sheets

600

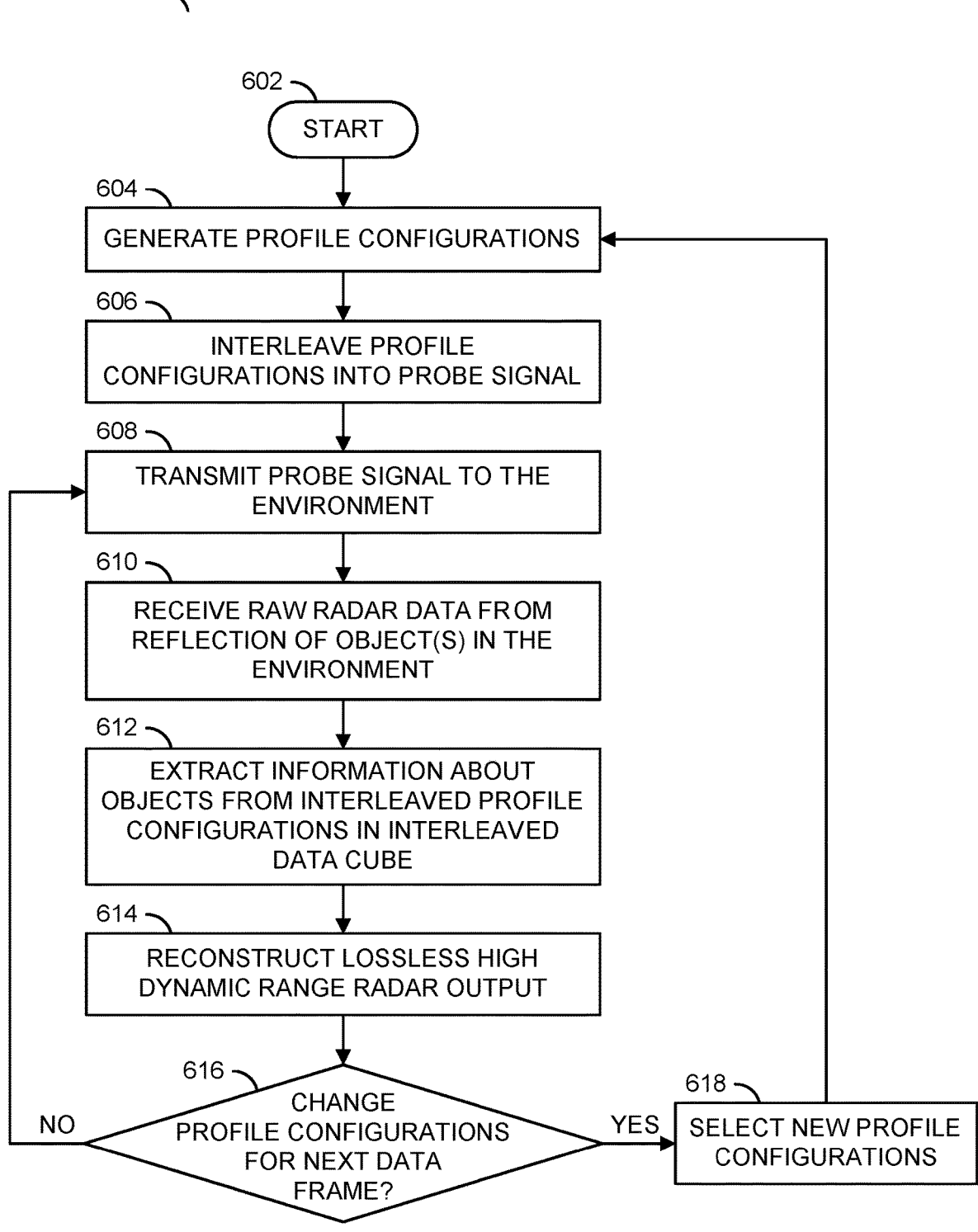

602

START

604

GENERATE PROFILE CONFIGURATIONS

606

INTERLEAVE PROFILE CONFIGURATIONS INTO PROBE SIGNAL

608

TRANSMIT PROBE SIGNAL TO THE ENVIRONMENT

610

RECEIVE RAW RADAR DATA FROM REFLECTION OF OBJECT(S) IN THE ENVIRONMENT

612

EXTRACT INFORMATION ABOUT OBJECTS FROM INTERLEAVED PROFILE CONFIGURATIONS IN INTERLEAVED DATA CUBE

614

RECONSTRUCT LOSSLESS HIGH DYNAMIC RANGE RADAR OUTPUT

616

CHANGE PROFILE CONFIGURATIONS FOR NEXT DATA FRAME?

NO

YES

618

SELECT NEW PROFILE CONFIGURATIONS

FIG. 12

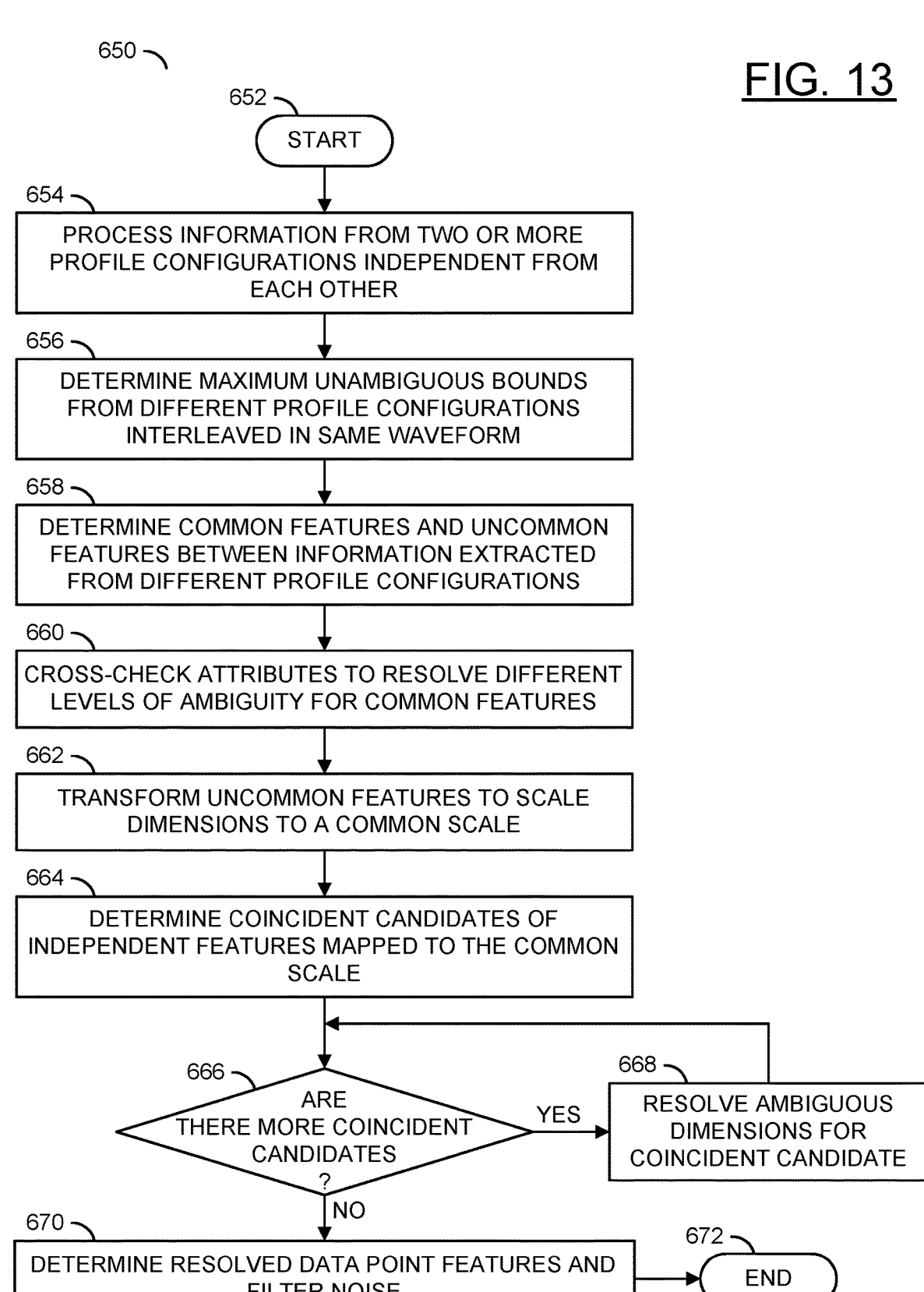

650

652 — START

FIG. 13

654 — PROCESS INFORMATION FROM TWO OR MORE PROFILE CONFIGURATIONS INDEPENDENT FROM EACH OTHER

656 — DETERMINE MAXIMUM UNAMBIGUOUS BOUNDS FROM DIFFERENT PROFILE CONFIGURATIONS INTERLEAVED IN SAME WAVEFORM

658 — DETERMINE COMMON FEATURES AND UNCOMMON FEATURES BETWEEN INFORMATION EXTRACTED FROM DIFFERENT PROFILE CONFIGURATIONS

660 — CROSS-CHECK ATTRIBUTES TO RESOLVE DIFFERENT LEVELS OF AMBIGUITY FOR COMMON FEATURES

662 — TRANSFORM UNCOMMON FEATURES TO SCALE DIMENSIONS TO A COMMON SCALE

664 — DETERMINE COINCIDENT CANDIDATES OF INDEPENDENT FEATURES MAPPED TO THE COMMON SCALE

666 — ARE THERE MORE COINCIDENT CANDIDATES ? — YES — 668 — RESOLVE AMBIGUOUS DIMENSIONS FOR COINCIDENT CANDIDATE

NO

670 — DETERMINE RESOLVED DATA POINT FEATURES AND FILTER NOISE — 672 — END

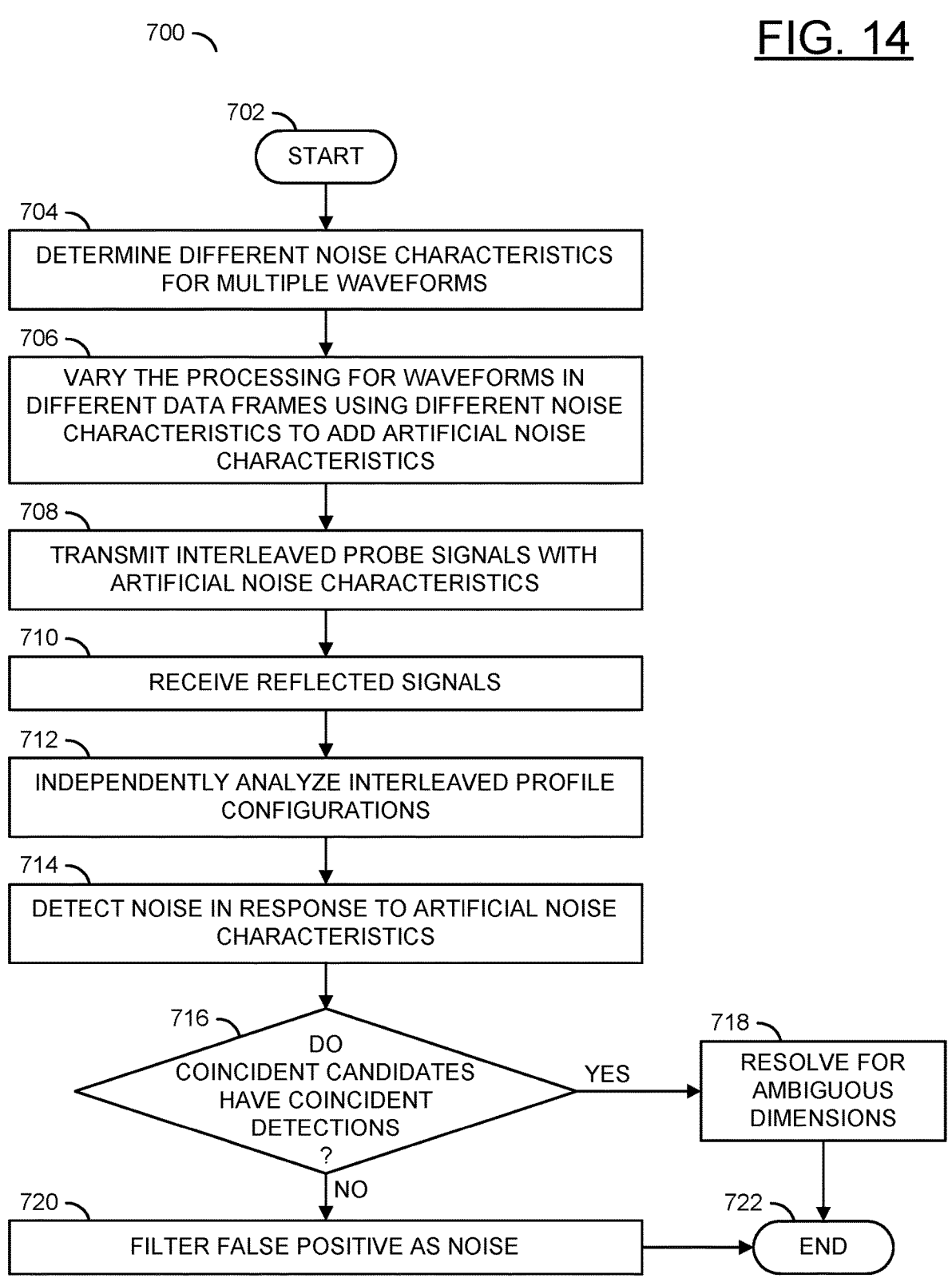

702
START

704
DETERMINE DIFFERENT NOISE CHARACTERISTICS FOR MULTIPLE WAVEFORMS

706
VARY THE PROCESSING FOR WAVEFORMS IN DIFFERENT DATA FRAMES USING DIFFERENT NOISE CHARACTERISTICS TO ADD ARTIFICIAL NOISE CHARACTERISTICS

708
TRANSMIT INTERLEAVED PROBE SIGNALS WITH ARTIFICIAL NOISE CHARACTERISTICS

710
RECEIVE REFLECTED SIGNALS

712
INDEPENDENTLY ANALYZE INTERLEAVED PROFILE CONFIGURATIONS

714
DETECT NOISE IN RESPONSE TO ARTIFICIAL NOISE CHARACTERISTICS

716
DO COINCIDENT CANDIDATES HAVE COINCIDENT DETECTIONS ?

YES

718
RESOLVE FOR AMBIGUOUS DIMENSIONS

NO

720
FILTER FALSE POSITIVE AS NOISE

722
END

AMBIGUITY RESOLUTION ACROSS MULTIPLE RADAR MEASUREMENT DOMAINS

This application relates to U.S. patent application Ser. No. 18/140,958, filed on Apr. 28, 2023, which relates to U.S. patent application Ser. No. 18/129,834, filed on Apr. 1, 2023, which relates to U.S. patent application Ser. No. 17/556,221, filed on Dec. 20, 2021, which relates to U.S. patent application Ser. No. 16/704,409, filed on Dec. 5, 2019 (now U.S. Pat. No. 11,243,304, filed on Feb. 8, 2022), which relates to U.S. patent application Ser. No. 16/503,908, filed on Jul. 5, 2019 (now U.S. Pat. No. 10,564,277, filed on Feb. 18, 2020), which relates to U.S. patent application Ser. No. 16/032,369, filed on Jul. 11, 2018 (now U.S. Pat. No. 10,509,119, filed on Dec. 17, 2019), which relates to U.S. patent application Ser. No. 15/883,372, filed on Jan. 30, 2018 (now U.S. Pat. No. 10,048,366, filed on Aug. 14, 2018). Each of the mentioned applications are hereby incorporated by reference in its entirety.

FIELD OF THE INVENTION

The invention relates to radar detection generally and, more particularly, to a method and/or apparatus for implementing ambiguity resolution across multiple radar measurement domains.

BACKGROUND

In conventional radar signal processing technology, there is a direct conflict between various parameters of a radar output. The parameters of the radar output that are in conflict are high radar resolution, a maximum operational range, angular ambiguity, a maximum unambiguous Doppler and processing gain. Generally, achieving better results for one parameter results in sacrificing the results for another parameter. In order to resolve the conflict, a trade-off is made between the various parameters.

Single frame radar performance is determined by the characteristics of the waveform (i.e., a chirp) used to collect a radar cube. The Bandwidth (BW) of the chirp determines the maximum unambiguous range of targets. The interchirp time (Tc) and Center Frequency (Fc) determines the maximum unambiguous Doppler of targets. The Center frequency (Fc) determines the maximum unambiguous direction of arrival, given the fixed antenna structure. When the physical target properties are beyond the unambiguous boundaries, the target is reported incorrectly as being within the values of the unambiguous boundaries.

In order to provide high quality radar output in real-time applications, radar signal processing technology should provide high quality results for all parameters simultaneously. The problem is currently addressed by simply trading off quality in some domains. Tradeoffs withing various dimensions are made to increase the ambiguity boundaries at the cost of another. For instance, reducing BW gives shorter Tc, which results in higher unambiguous Doppler at the cost of smaller unambiguous range resolution. In some systems, the problem is partly addressed by using complex iterative algorithms, which come at the cost of long latencies, expensive compute resources and high error rates. For example, resolving across data cubes collected in bursts, frames, and sub-periods involves consideration of scene changes across time and feedback loops across time. As the scenario becomes too complex to be tracked across frames, the approach fails.

It would be desirable to implement ambiguity resolution across multiple radar measurement domains.

SUMMARY

The invention concerns an apparatus comprising an interface and a processor. The interface may be configured to present a probe signal and receive raw radar data generated in response to a reflection of the probe signal. The processor may be configured to generate a plurality of profile configurations, interleave the plurality of profile configurations into the probe signal, present the probe signal to the interface, receive the raw radar data from the interface, and reconstruct a radar output based on the plurality of profile configurations in response to the raw radar data. Interleaving the plurality of profile configurations into the probe signal may enable the raw radar data to be received comprising information about an environment corresponding to each of the plurality of profile configurations at one time frame. Interleaving the plurality of profile configurations may enable the processor to extract the information about the environment corresponding to each of the plurality of profile configurations independent from each other. The radar output may comprise the information about the environment.

BRIEF DESCRIPTION OF THE FIGURES

Embodiments of the invention will be apparent from the following detailed description and the appended claims and drawings.

FIG. 12 is a flow diagram illustrating a method for ambiguity resolution across multiple radar measurement domains.

FIG. 13 is a flow diagram illustrating a method for independently resolving information from interleaved profile configurations received in a reflected probe signal.

FIG. 14 is a flow diagram illustrating a method for filtering noise in response to generating artificial noise characteristics.

DETAILED DESCRIPTION OF THE EMBODIMENTS

Figure 1:
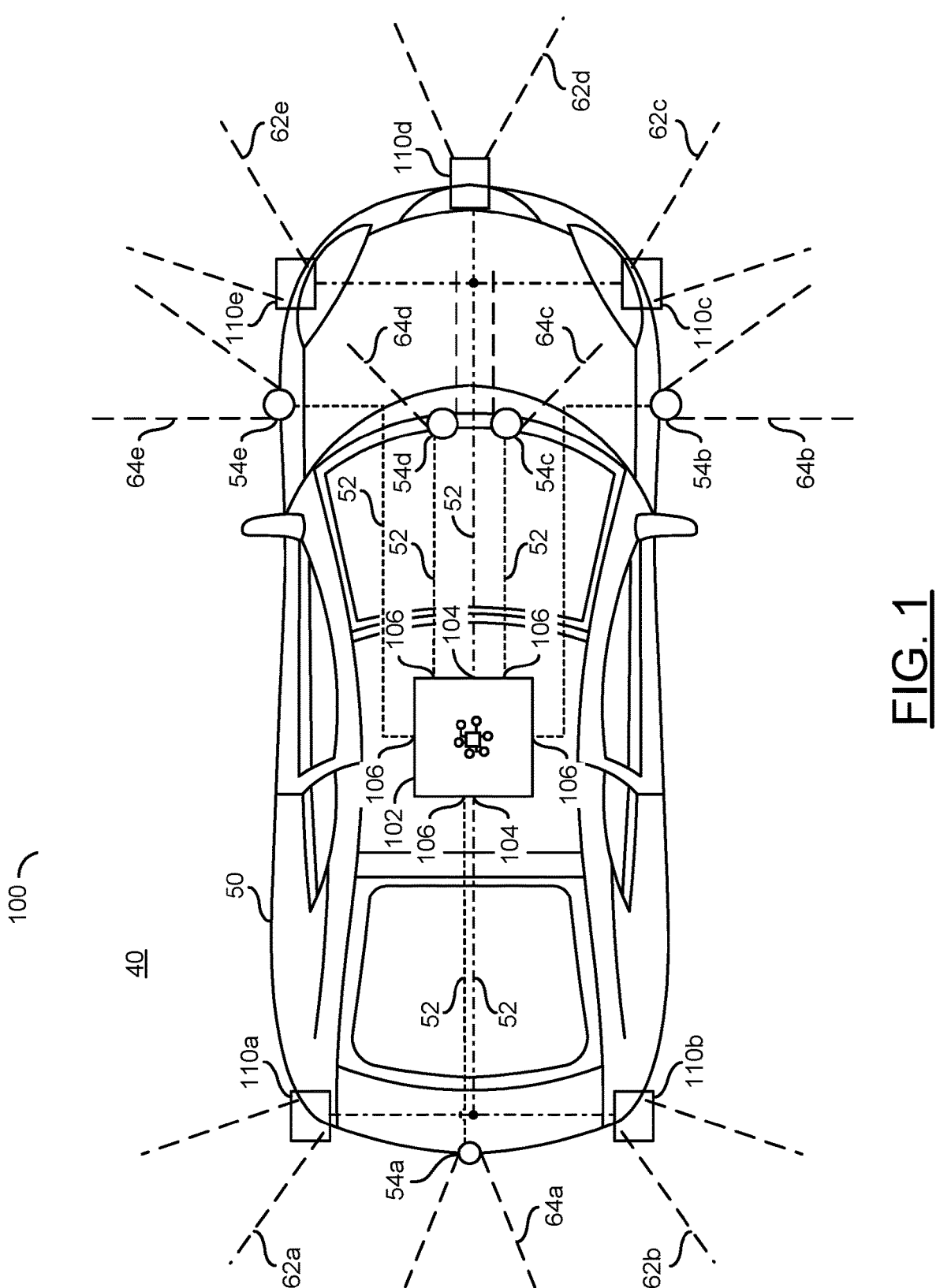
FIG. 1 is a diagram illustrating an embodiment of the present invention implemented in a vehicle.

Embodiments of the present invention include providing ambiguity resolution across multiple radar measurement domains that may (i) interleave multiple profile configurations into a single probe signal, (ii) resolve multiple parameters for a radar output without a trade-off, (iii) resolve a coupling between the maximum unambiguous Doppler, range resolution, angle ambiguity, maximum operational range and processing gain, (iv) resolve ambiguities across multiple domains coherently, (v) produce high dynamic range output, (vi) preserve inherent benefits from each interleaved sequence in the probe signal, (vii) use multiple profile configurations to look at a scenario simultaneously, (viii) extract information from the multiple profile configurations independently and/or (ix) be implemented as one or more integrated circuits.

Embodiments of the present invention may be configured to generate probe signals (e.g., chirps) comprising multiple profile configurations. The multiple profile configurations may be interleaved in the probe signals. Interleaving the multiple profile configurations in the same probe signal may enable ambiguity resolution across multiple radar measurement domains.

Embodiments of the present invention may be configured to receive raw radar data comprising reflections of the probe signals comprising the interleaved multiple profile configurations. An interleaved radar data cube comprising the interleaved profile configurations may be processed from the raw radar data. A high dynamic range radar output may be reconstructed in response to the multiple profile configurations detected in the raw radar data.

Reconstructing the high dynamic range radar output in response to the multiple profile configurations interleaved in the probe signals may enable overcoming the inherent conflict between various radar output parameters. For example, a coupling between various output parameters, such as the maximum unambiguous Doppler, range resolution, angle ambiguity, maximum operational range and processing gain may be resolved without sacrificing one or more of the output parameters. Without interleaving the multiple profile configurations into the probe signals, multiple domains (e.g., the output parameters) may not be able to be resolved coherently and/or without trade-offs.

Interleaved data cube processing may be implemented. The interleaved data cube processing may enable reconstructing the high resolution radar output from raw radar data generated in response to the reflections of the probe signals that were transmitted with the interleaved profile configurations. The probe signals may be generated with varying characteristics alternating (e.g., a set of alternating chirps that have different profile configurations) in order to provide different representations of the same scenario that may be received by a radar system transceiver. For example, the varying characteristics may comprise adjustments to frequency, phase, slope, gain, chirp period, sampling rate, etc. The interleaved data cube processing may comprise implementing encoder control, intra-data prediction, scaling and quantization, decoding and de-interleaving, studying dimensionality, performing principal component analysis, performing feature analysis, inverse transforms, filter control analysis, and/or entropy.

To perform the interleaved data cube processing, the waveforms may be designed to enable determining independent information about an environment from multiple domains. For example, different parameters that correspond to the same scene at the same time may be reported differently to enable independent analysis of results of a parameter. The waveforms may further be designed to enable information from multiple independent domains that have some features (or parameters) reported exactly the same. The interleaved data cube processing may determine data that is constant between one or more of the multiple profile configurations. Cross-checking may be implemented to resolve unambiguous bounds for features that are not constant. Mapping may be implemented. For example, common features may be mapped and then mathematical transformations may be performed to bring uncommon features into a common dimension to provide a common scale between two profiles. Ambiguities may be resolved once the independent features are mapped to the same scale. For example, coincident candidates may be determined in order to resolve ambiguities between data points. The ambiguities may be resolved without adding latency and/or errors. Coincident candidates that are unable to be resolved may be discarded as false positives in order to remove noise. In some embodiments, the waveforms may be created with artificially different noise characteristics to facilitate the elimination of noise.

Referring to FIG. 1, a diagram illustrating an embodiment of the present invention implemented in a vehicle is shown. A system 100 is shown. The example embodiment of the system 100 may be shown in the context of a top down view of a vehicle 50 in an environment 40. In the example shown, the vehicle 50 may be a car. In some embodiments, the vehicle 50 may be a truck, an ATV, an airplane, a drone, etc. In one example, the vehicle 50 may be an electric vehicle (EV). In another example, the vehicle 50 may be a hybrid electric vehicle. In yet another example, the vehicle 50 may be an internal combustion engine (ICE) vehicle. The type of the vehicle 50 implementing the system 100 may be varied according to the design criteria of a particular implementation.

The vehicle 50 may comprise a data network 52, a number of blocks (or circuits) 54a-54e, a block (or circuit) 102, an interface 104, and interface 106 and/or a number of blocks (or circuits) 110a-110e. The circuits 54a-54e may each implement a camera system. The circuit 102 may implement a centralized processing device. The circuits 110a-110e may each implement a radar device and/or frontend. While the radar frontends 110a-110e and the camera systems 54a-54e are shown, the vehicle 50 may comprise more or fewer of the radar frontends 110a-110e and/or the camera systems 54a-54e. In some embodiments, the vehicle 50 may comprise multiple implementations of the centralized processing device 102. The vehicle 50 may comprise other components (not shown). For example, other types of sensors may be implemented (e.g., sonar, lidar, ultrasonics, etc.). The number, type and/or arrangement of the components of the vehicle 50 may be varied according to the design criteria of a particular implementation.

The data network 52 may be implemented throughout the vehicle 50. The data network 52 may be configured to communicate data from an edge site of the vehicle 50 (e.g., an edge site at the locations of the radar frontends 110a-110e and/or the camera systems 54a-54e) to other components of the vehicle 50. In an example, the data network 52 may be configured to communicate data from various sensors to corresponding ECUs. In another example, the data network 52 may be configured to communicate data to/from the centralized processing device 102. The data network 52 may be configured to communicate data according to a predefined protocol (e.g., a CAN bus communications protocol, an I2C bus protocol, an Ethernet protocol, a wireless protocol, etc.). Generally, the data network 52 may comprise a low bandwidth, low cost data bus implemented by the vehicle 50 (e.g., data buses that may be common in commercially available vehicles). In one example, the data network 52 may implement a CAN bus of the vehicle 50. In some embodiments, the amount of data communicated throughout the vehicle 50 may be limited to the constraints of the data network 52. The implementation of the data network 52 may be varied according to the design criteria of a particular implementation.

The centralized processing device 102 may be configured to communicate data to/from the data network 52. The centralized processing device 102 may comprise the interface 104 and/or the interface 106. The interface 104 may be a radar data interface. The radar data interface 104 may be configured to receive data communicated by the radar frontends 110a-110e via the data network 52. The radar data interface 104 may be configured to send data generated from the centralized processing device 102 via the data network 52 to one or more of the radar frontends 110a-110e. The interface 106 may be a video data interface. The video data interface 106 may be configured to receive data communicated by the camera systems 54a-54e via the data network 52. The video data interface 106 may be configured to send data generated from the centralized processing device 102 via the data network 52 to one or more of the camera systems 54a-54e. Additional interfaces (e.g., a sensor data interface) may be implemented by the centralized processing device 102 (e.g., to communicate data to/from various other sensors, not shown). In some embodiments, the radar data interface 104 and/or the video data interface 106 may comprise a number of data ports. The radar data interface 104 and/or the video data interface 106 may be configured to convert and/or translate data for compatibility with the communication standard implemented by the data network 52. The number, type and/or implementation of the radar data interface 104, the video data interface 106 and/or other interfaces of the centralized processing device 102 may be varied according to the design criteria of a particular implementation.

The radar devices (or frontends) 110a-110e may be located at various edge sites of the vehicle 50. The edge sites of the vehicle 50 may be located at a periphery of the vehicle 50 and/or throughout the vehicle 50. In the example shown, the radar frontend 110d may be implemented on a front bumper of the vehicle 50. In another example, the radar frontends 110a-110b are shown implemented on either side of a rear bumper of the vehicle 50. In some embodiments, one or more of the radar frontends 110a-110e may be implemented on a periphery of the vehicle 50. In some embodiments, one or more of the radar frontends 110a-110e may be implemented on a roof the vehicle 50. The of number radar frontends 110a-110e implemented and/or the particular edge sites of the vehicle 50 that the radar frontends 110a-110e may be implemented at may be varied according to the design criteria of a particular implementation.

The radar frontends 110a-110e may each be configured to determine a proximity and/or location of objects/obstacles around the vehicle 50. The radar frontends 110a-110e may be configured as long-range and/or short-range sensors. The radar frontends 110a-110e may be configured to generate a radar (or probe) signal, which may be reflected back to the radar frontends 110a-110e by the objects near the vehicle 50. The reflected data received by the radar frontends 110a-110e corresponding to the radar signal may be processed and/or analyzed in order to generate data about the objects in the environment 40 near the vehicle 50. In some embodiments, the data generated by the radar frontends 110a-110e may be used by the centralized processing device 102 to create a radar mapping of the environment 40.

Pairs of dashed lines 62a-62e are each shown extending from a respective one of the radar frontends 110a-110e. The pairs of dashed lines 62a-62e may represent a radio frequency pattern emitted by the respective radar frontends 110a-110e. The shape, intensity and/or direction of the radio frequency patterns 62a-62e may determine a detection range of the radar frontends 110a-110e. The radar frontends 110a-110e may be implemented at various locations around the vehicle 50. The radio frequency patterns 62a-62e may be generally emitted all around the vehicle 50 in order to capture data about the environment 40 in all directions from the vehicle 50. The radio frequency patterns 62a-62e may have a range of approximately 200 meters to 450 meters, with a 150 degree azimuth field of view and a 45 degree elevation field of view. The particular range of the radio frequency patterns 62a-62e may be varied according to the design criteria of a particular implementation.

The radar frontends 110a-110e may each implement an antenna array and/or waveguide network. The antenna array and/or waveguide network implemented by the radar frontends 110a-110e may enable a sparse array configured to provide information that may be used by the centralized processing device 102 to reconstruct a high resolution of data. In an example, the radar frontends 110a-110e may each be configured to generate a dynamic waveform and the centralized processing device 102 may use artificial intelligence to learn from and/or adapt to the environment 40 near the vehicle 50. The sparse array implemented by the radar frontends 110a-110e may enable a high resolution of data to be acquired with a low module cost. The radar frontends 110a-110e may be configured to generate raw radar data at a low volume that may be converted to a high resolution of data while consuming between 3 watts to 10 watts of power. Details of the antenna array and/or waveguide network implemented by the radar frontends 110a-110e may be described in association with U.S. application Ser. No. 17/945,379, filed on Sep. 15, 2022 and U.S. application Ser. No. 17/958,268, filed on Sep. 30, 2022, appropriate portions of which are incorporated by reference.

In some embodiments, the radar frontends 110a-110e may comprise antenna arrays that generate raw radar data with sparsity (e.g., low volume data). In some embodiments, the radar frontends 110a-110e may comprise antenna arrays with a dense array that generate raw radar data without sparsity (e.g., high volume data). In some embodiments, the radar frontends 110a-110e may comprise a combination of radar devices with sparsity and without sparsity. Radar data without sparsity may undergo data sparsification (e.g., as an aftermarket add-on) to convert the high volume of data to a low volume of data before being sent over the data network 52.

The camera systems 54a-54e may be configured to capture pixel data, generate images and/or generate video frames of the environment 40 near the vehicle 50. In some embodiments, the pixel data may be communicated over the data network 52 to the centralized processing device 102 and the centralized processing device 102 may be configured to generate video frames in response to the pixel data. In some embodiments, the camera systems 54a-54e may be configured to generate video frames in response to the pixel data captured, compress the video frames and the compressed video frames may be communicated over the data network 52 to the centralized processing device 102. The video frames generated based on the data from the camera systems 54a-54e may be used for computer vision operations to detect objects/obstacles around the vehicle 50. The camera systems 54a-54e may comprise RGB cameras, RGB-IR cameras, stereo cameras, monocular cameras, thermal imaging cameras, etc. The number and/or types of the camera systems 54a-54e implemented may be varied according to the design criteria of a particular implementation.

Pairs of dashed lines 64a-64e are each shown extending from a respective one of the camera systems 54a-54e. The pairs of dashed lines 64a-64e may represent a field of view captured by the camera systems 54a-54e. The fields of view 64a-64e of the camera systems 54a-54e may or may not overlap with the regions covered by the radio frequency patterns 62a-62e of the radar frontends 110a-110e. The camera systems 54a-54e may be implemented at various locations (e.g., edge sites) around the vehicle 50. The fields of view 64a-64e may be generally captured all around the vehicle 50 in order to capture data of the environment 40 in all directions from the vehicle 50 (e.g., a 360 degree field of view). The particular range and/or directions of the fields of view 64a-64e may be varied according to the design criteria of a particular implementation.

The centralized processing device 102 is shown at a generally central location in the vehicle 50. In an example, the centralized processing device 102 may implement a zone (or domain) processor. The centralized processing device 102 may be configured to receive input comprising the output from the radar frontends 110a-110e (e.g., raw radar data) and/or the video frames generated by the camera systems 54a-54e. In some embodiments, multiple implementations of the centralized processing device 102 may be implemented near groups (or clusters) of the radar frontends 110a-110e and/or the camera systems 54a-54e (e.g., at a particular zone of the vehicle 50). The location(s) of the centralized processing device 102 and/or the number of the radar frontends 110a-110e and/or camera systems 54a-54e that provide data to the centralized processing device 102 may be varied according to the design criteria of a particular implementation.

The centralized processing device 102 may be configured to process raw data streams generated by the radar frontends 110a-110e, the camera systems 54a-54e and/or other sensors. The centralized processing device 102 may be configured to implement deep sensor fusion in order to combine interpretations of the data from the radar frontends 110a-110e with interpretations of the data from the camera systems 54a-54e and/or data inputs from other sensors (not shown) in order to make inferences using multiple sources of data that would not be possible based on one of the data sources alone. In an example, the centralized processing device 102 may be configured to interpret the high resolution data generated in response to the low volume data provided by the radar frontends 110a-110e. In another example, the centralized processing device 102 may be configured to perform computer vision operations on the video frames generated by the camera systems 54a-54e in order to detect objects.

The centralized processing device 102 may be configured to implement central compute capabilities that enable high performance without implementing a dedicated processor for each of the radar frontends 110a-110e. Implementing the centralized processing device 102 may enable the radar frontends 110a-110e to be implemented at a lower cost because a dedicated processor may not be implemented for each of the radar frontends 110a-110e. The centralized processing device 102 may be configured to enable sparsity in the implementation of the radar frontends 110a-110e in order to determine the boundary conditions for a particular resolution of data. The centralized processing device 102 may enable the radar frontends 110a-110e to undersample the environment while preventing artifacts, grading lobes and/or false alarms.

The centralized processing device 102 may be configured to adaptively modulate the information generated by the radar frontends 110a-110e to enable fewer antennas to be implemented in the antenna arrays of the radar frontends 110a-110e. Instead of processing data from the radar frontends 110a-110e at the edge (e.g., one processor on-board with the same technology node for each of the radar frontends 110a-110e), the sparse (e.g., low volume) raw radar data from the radar frontends 110a-110e may be processed by the centralized processing device 102. The sparse antenna array implemented by the radar frontends 110a-110e may enable low bandwidth data to be transmitted from the radar frontends 110a-110e over the data network 52 to the centralized processing device 102. The centralized processing device 102 may be configured to expand the resolution of the data received from the radar frontends 110a-110e. The centralized processing device 102 may be configured to dynamically shift radar processing capabilities around the vehicle 50 on an as-needed basis in response to various detection scenarios. The centralized processing device 102 may be configured to implement joint bistatic processing from multiple of the distributed radar frontends 110a-110e to provide a high resolution and/or sensitivity.

The centralized processing device 102 may utilize a dynamic adaptive waveform. The centralized processing device 102 may learn and/or adapt to the environment 40. The centralized processing device 102 may take advantage of sparsity to capture the boundary conditions for the data that may be used for providing a particular resolution. Sparsity may undersample the environment 40. To avoid grading lobes and/or artifacts that may result from multiple solutions that may be available for reconstructing a dense amount of data using sparsity, an adaptive waveform may be implemented. The adaptive waveform used for the radio frequency patterns 62a-62e may provide a shifting waveform that may be effectively controlled in a deterministic fashion. By adaptively modulating the information, fewer antennas may be used by each of the radar frontends 110a-110e. Artifacts from the sparsity may be suppressed by aggregating information that may be adaptive over time. The adaptive waveform implemented may provide a sparse data cube that may enable reconstructing a high resolution of radar detections that no longer scales with the number of antennas implemented by the radar frontends 110a-110e. The high resolution of the radar detections may scale with how efficiently the centralized processing device 102 performs computations and/or how quickly a phase may be modulated onto the adaptive transmitted signal.

Figure 2:
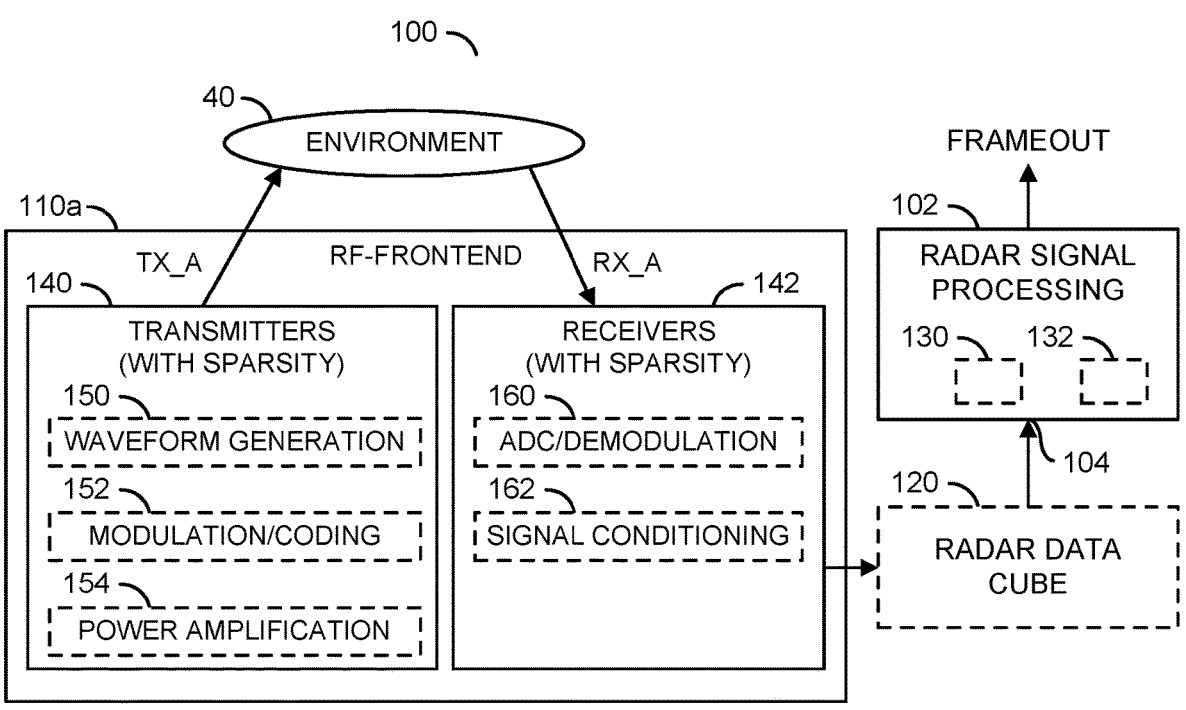
FIG. 2 is a block diagram illustrating an example embodiment of a radar system with sparse antennas and a processing chain.

Referring to FIG. 2, a block diagram illustrating an example embodiment of a radar system with sparse antennas and a processing chain is shown. The apparatus 100 is shown comprising the centralized processing device 102 and/or the radar frontend 110a. The radar frontend 110a may be configured to transmit data to and/or receive data from the environment 40. The radar frontend 110a may be configured to communicate with the centralized processing device 102 via the data network 52. A radar data cube 120 is shown generated by the radar front end 110a. The radar data cube 120 may be presented to the centralized processing device 102.

In the example shown, the apparatus 100 may comprise the centralized processing device 102 and one of the radar frontends 110a-110n. The spatial temporal multi-snapshot (STMS) data integration, ambiguity resolution and/or radar signal processing (e.g., interleaved radar data cube processing) implemented by the apparatus 100 may be performed with the single radar frontend 110a, as shown. While the single radar frontend 110a implementation is shown as an illustrative example, the STMS data integration, ambiguity resolution and/or radar signal processing may be implemented similarly with any number of the radar frontends 110a-110n. For example, the apparatus 100 implementing the centralized radar architecture shown in association with FIG. 1 may be compatible with the single radar frontend 110a and/or extended to any number of the radar frontends 110a-110n. Generally, any type of radar frontends 110a-110n may be implemented with the apparatus 100. Assuming that the radar frontends 110a-110n may handle any thermal requirements of generating a continuous stream of raw radar data, the centralized processing device 102 may perform the processing.

The centralized processing device 102 may comprise a block (or circuit) 130 and/or a block (or circuit) 132. The circuit 130 may implement a processor. The circuit 132 may implement a memory. The centralized processing device 102 may comprise other components (not shown). The number, type and/or arrangement of the components of the centralized processing device 102 may be varied according to the design criteria of a particular implementation.

Each of the radar frontends 110a-110n may comprise a block (or circuit) 140 and/or a block (or circuit) 142. The circuit 140 may implement a transmitter. The circuit 142 may implement a receiver. The radar frontends 110a-110n may comprise other components (not shown). The number, type and/or arrangement of the components of the radar frontends 110a-110n may be varied according to the design criteria of a particular implementation.

The transmitters 140 of the radar frontends 110a-110n may be configured to generate respective signals (e.g., TX_A-TX_N). In the example with the single radar frontend 110a, only the signal TX_A is shown, for illustrative purposes. The signals TX_A-TX_N may be output signals transmitted to the environment 40. In an example, each of the signals TX_A-TX_N may be a probe signal. Each of the probe signals TX_A-TX_N generated may comprise individual waveform characteristics. In an example, a first probe signal TX_A generated by the transmitter 140 of the radar frontend 110a may comprise a first distinct (or unique or predefined) waveform characteristic, then a second probe signal TX_A generated by the transmitter 140 of the radar frontend 110a may comprise a second distinct (or unique or predefined) waveform, etc. In some embodiments, each of the probe signals TX_A-TX_N may cycle through a predefined set of a number of distinct waveform characteristics. In some embodiments, each of the probe signals TX_A-TX_N may comprise the same waveform characteristic during the same timeframe (e.g., at a first timeframe, each of the probe signals TX_A-TX_N may emit the first waveform characteristic from different edge sites to the environment 40, then at a second timeframe, each of the probe signals TX_A-TX_N may emit the second waveform characteristic from different edge sites to the environment 40, etc.). The types of the probe signals TX_A-TX_N generated may be varied according to the design criteria of a particular implementation.

The transmitters 140 may each comprise a block (or circuit) 150, a block (or circuit) 152 and/or a block (or circuit) 154. The block 150 may implement a waveform generation module. The block 152 may implement a modulation/coding module. The block 154 may implement a power amplification module. The transmitters 140 may each comprise other components (not shown). The number, type and/or arrangement of the components of the transmitters 140 may be varied according to the design criteria of a particular implementation.

The waveform generation module 150 may be configured to generate the probe signals TX_A-TX_N comprising the various waveform characteristics. The may be configured to select a communication frequency for the waveform characteristics for the probe signals TX_A-TX_N. In an example, the modulation/coding module 152 may select a high frequency carrier signal and/or channel for communicating the probe signals TX_A-TX_N. The power amplification module 154 may be configured to provide a power level for the probe signals TX_A-TX_N. For example, in response to the power level selected by the power amplification module 154 and the frequency selected by the modulation/coding module 152, the waveform generation module 150 may output the probe signals TX_A-TX_N from the transmitters 140 with the distinct waveform characteristics.

The receivers 142 of the radar frontends 110a-110n may be configured to receive respective signals (e.g., RX_A-RX_N). In the example with the single radar frontend 110a, only the signal RX_A is shown, for illustrative purposes. The signals RX_A-RX_N may be input signals received from the environment 40. In an example, each of the probe signals TX_A-TX_N may be reflected back from objects in the environment 40 and received as the reflected signals RX_A-RX_N. The receivers 142 may be configured to perform various operations on the reflected signals RX_A-RX_N. For example, the operations performed by the receivers 142 may enable the various waveform characteristics of the transmitted signals TX_A-TX_N to be extracted and/or isolated in the reflected signals RX_A-RX_N. The reflected signals RX_A-RX_N may correspond to the waveform characteristics of the probe signals TX_A-TX_N.

The receivers 142 may be configured to generate a radar data cube 120. The radar data cube 120 may comprise raw radar data generated by the receivers 142. The operations performed by the receivers 142 may be configured to generate the raw radar data of the radar data cube 120 in response to the reflected signals RX_A-RX_N. Generally, the radar data cube 120 may comprise a low volume of data. For example, the low volume of data of the radar data cube 120 may be enabled because of the sparsity of the antenna arrays of the transmitters 140 and the receivers 142. In one example, the antenna arrays implemented by the transmitters 140 and/or the receivers 142 implementing the sparse antenna array may comprise twelve antenna heads. The raw radar data of the radar data cube 120 may be transmitted to the data network 52. Each of the radar frontends 110a-110n may generate a respective one of the radar data cubes 120 (e.g., during a data acquisition time).

The receivers 142 may each comprise a block (or circuit) 160 and/or a block (or circuit) 162. The block 160 may implement an analog to digital conversion (ADC) and/or demodulation module. The block 162 may implement a signal conditioning module. The receivers 142 may each comprise other components (not shown). The number, type and/or arrangement of the components of the receivers 142 may be varied according to the design criteria of a particular implementation.

The ADC and/or demodulation module 160 may be configured to perform analog to digital conversion and/or demodulation operations on the reflected signals RX_A-RX_N. The ADC operations may comprise sampling and/or quantization in order to convert the analog reflected signals RX_A-RX_N to a digital version that may be operated on digitally. The demodulation operations may be configured to retrieve the waveform characteristics from the reflected signals RX_A-RX_N that may have been adapted to a particular transmission channel. In an example, the demodulation operations may extract and/or isolate the waveform characteristics in the reflected signals RX_A-RX_N (e.g., the unique characteristics that correspond to the probe signals TX_A-TX_N). The signal conditioning module 154 may be configured to prepare the reflected signals RX_A-RX_N for communication via the data network 52. For example, in response to waveform characteristics extracted from the reflected signals RX_A-RX_N by the demodulation module 160, the signal conditioning module 162 may output the raw radar data from the receivers 142. The demodulation module 160 and/or the signal conditioning module 162 may perform ambiguity resolution. The ambiguity resolution may be determined in response to data of the waveform characteristics received from the modulation/coding module 152.

In the example shown, each of the transmitters 140 and/or the receivers 142 implemented by the radar frontends 110a-110n may implement sparsity. For example, each of the radar frontends 110a-110n may comprise the transmitters 140 and/or the receivers 142 without implementing a local memory and/or a local processor. For example, each of the radar frontends 110a-110n may generate the raw radar data with the low data volume, and rely on the centralized processing device 102 to generate the high resolution data from the raw radar data.

In some embodiments, not all of the radar frontends 110a-110n of the apparatus 100 may implement sparsity. In an example, one or more of the radar frontends 110a-110n may be implemented without sparsity. In the example with one or more of the radar frontends 110a-110n implemented without sparsity, each of the radar frontends 110a-110n that do not implement sparsity may generate a high volume of raw radar data. For example, the volume of data in the raw radar data radar data cube 120 generated with sparsity may be less than the high volume of the raw radar data generated without sparsity (e.g., by a factor of sixteen).

In another example, one or more of the radar frontends 110a-110n may be implemented with local memories and/or local processors. The local processors implemented by the radar frontends 110a-110n may analyze the high volume of raw radar data generated by the receivers 142 (without sparsity) and determine radar detections. The local processors implemented by the radar frontends 110a-110n may comprise a high volume of data that may be communicated over the data network 52. Generally, the apparatus 100 may be implemented with each of the radar frontends 110a-110n implemented with sparsity and the centralized processing device 102 may receive the low volume raw radar data cube 120 communicated over the data network 52. However, in some embodiments, the centralized processing device 102 may be configured to be backwards compatible and/or operate as an aftermarket addition to the vehicle 50 that may be configured to also work with a high volume of raw radar data generated by radar devices that do not implement sparsity and/or radar devices that implement local memories and local processors that provide radar detection output. In some embodiments, the apparatus 100 may comprise a data sparsification module that may be installed in the radar frontends 110a-110n that may convert raw radar data without sparsity to raw radar data with sparsity before the data is sent to the data network 52, which may be described in association with U.S. application Ser. No. 18/129,834, filed on Apr. 1, 2023, appropriate portions of which are incorporated by reference.

The processor 130 and/or the memory 132 of the centralized processing device 102 may be configured to perform radar signal processing. The radar signal processing may be performed in a temporal domain and/or spatial domain. The centralized processing device 102 may generate a signal (e.g., FRAMEOUT) The signal FRAMEOUT may comprise frame output data. The frame output data may comprise a range, Doppler, angle, etc. The frame output data in the output signal FRAMEOUT may be generated in response to the radar signal processing performed on the radar data cube 120.

In some embodiments, the output signal FRAMEOUT may be generated by the processor 130 and presented externally (e.g., presented to another device and/or application). In some embodiments, the output signal FRAMEOUT may be generated by the processor 130 and used internal to the centralized processing device 102. For example, the output signal FRAMEOUT may be used internally for centralized deep sensor fusion in combination with computer vision analysis performed by the centralized processing device 102 on the video data generated by the camera systems 54a-54n and/or other sensor data. In another example, the output signal FRAMEOUT may be used internally to perform dynamic resource allocation and/or dynamic scheduling of the centralized processing device 102. In yet another example, the output signal FRAMEOUT may be used internally by the centralized processing device 102 to analyze a radar output mapping of the environment 40. The usage of the output signal FRAMEOUT may be varied according to the design criteria of a particular implementation. Details of the centralized processing device 102 may be described in association with U.S. application Ser. No. 18/129,834, filed on Apr. 1, 2023, appropriate portions of which are incorporated by reference.

The centralized processing device 102 and/or the processor 130 may be configured to execute computer readable instructions. In response to executing the computer readable instructions, the processor 130 may be configured to perform a number of steps. The centralized processing device 102 may be configured to receive the continuous stream of raw radar from the radar frontends 110a-110n (e.g., at the radar data interface 104). For example, the receivers 142 may communicate the low volume raw radar data cube 120 to the data network 52 and the centralized processing device 102 may receive the raw radar data cube 120 from the data network 52.

The processor 130 may be configured to process one of the radar data cubes 120 from the raw radar data during a first time frame and process another one of the radar data cubes 120 from the raw radar data during a second time frame. The processor 130 may be configured to perform a continuous interleaving of radar data cubes 120 as the raw radar data are received. The processor 130 may generate the frame output data signal FRAMEOUT for a first one of the data cubes 120 based on the radar signal processing. The processor 130 may generate the frame output data signal FRAMEOUT for a next one of the data cubes 120 based on the continuous interleaving of the radar data cubes 120.

Each subsequent data cube 120 may be interleaved with the previous data cube 120. The processor 130 may utilize an equivalency of the subsequent data cubes 120 from the interleaving to derive the frame output data along with a limited variation between the subsequent data cubes 120 to generate the frame output data signal FRAMEOUT. The processor 130 may be configured to generate high resolution radar data based on virtual aperture imaging. The high resolution radar data may provide radar detections.

In some embodiments, the processor 130 may implement one or more coprocessors, cores and/or chiplets. For example, the processor 130 may implement one coprocessor configured as a general purpose processor and another coprocessor configured as a video processor. In some embodiments, the processor 130 may implement a dataflow vector processor. In some embodiments, the processor 130 may be a dedicated hardware module designed to perform particular tasks. In an example, the processor 130 may implement an AI accelerator. In another example, the processor 130 may implement a radar processor. In some embodiments, other processors implemented by the apparatus 100 and/or the centralized processing device 102 may be generic processors and/or video processors (e.g., a coprocessor that is physically a different chipset and/or silicon from the radar signal processing). In one example, the processor 130 may implement an x86-64 instruction set. In another example, the processor 130 may implement an ARM instruction set. In yet another example, the processor 130 may implement a RISC-V instruction set. The number of cores, coprocessors, the design optimization and/or the instruction set implemented by the processor 130 may be varied according to the design criteria of a particular implementation.

The memory 132 implemented by the centralized processing device 102 may provide data storage for the apparatus 100. The memory 132 may be configured to store the computer readable instruction that may be executed by the processor 130. The memory 132 may be configured to store video data, the raw radar data cubes 120, high resolution radar detections and/or sensor output. The memory 132 may provide volatile and/or non-volatile storage. The memory 132 may provide mass data storage. The memory 132 may comprise embedded memory and/or removable storage. In an example, the memory 132 may implement a cache. In another example, the memory 132 may implement a SD card (or microSD card). The memory 132 may be configured to store training data for an AI model. The type and/or capacity of the memory 132 may be varied according to the design criteria of a particular implementation.

The combination of the memory 132 and/or the processor 130 of the centralized processing device 102 may enable the radar frontends 110a-110n to be implemented with no individual local processors and/or no individual local memories. The processor 130 of the centralized processing device 102 may provide more processing capabilities than a local processor that may be implemented by each edge radar device that does not implement the apparatus 100. Similarly, the memory 132 of the centralized processing device 102 may provide more memory capacity than a local memory that may be implemented by each radar device that does not implement the centralized radar architecture of the apparatus 100. In one example, the centralized processing device 102 may be configured to provide a processing bandwidth of approximately 1.3G (ADC samples/s) compared to a typical local processor (e.g., implemented at the edge sites with the radar frontends 110a-110n) that may provide a processing bandwidth of 31M (ADC samples/s). In another example, the centralized processing device 102 may comprise approximately 32 GB of memory (or more) compared to a typical memory of a local processor (e.g., implemented at the edge sites with the radar frontends 110a-110n) that may provide approximately 8 MB of memory. The centralized processing device 102 may be configured to be implemented on modern technology and/or fabrication nodes. In an example, the centralized processing device 102 may be implemented on a 5 nm technology node, while a local processor may be limited to a technology node used for the radar transceiver (e.g., the local processors may not be optimized for digital processing and may be constrained by technology used for RF processing).

The centralized processing device 102 may be configured to perform centralized virtual aperture imaging (CVAI). The centralized processing device 102 may be configured to receive the low volume raw radar data cubes 120 from each of the radar frontends 110a-110n. The CVAI may be configured to perform virtual aperture imaging for reconstructing high resolution detections based on the each of the raw radar data cubes 120. The virtual aperture imaging may be configured to use the waveform characteristics in the raw radar data cubes 120 in order to generate physical antenna data, extrapolated virtual antenna data and/or interpolated virtual antenna data. For example, the virtual aperture imaging may enable additional data points (e.g., the extrapolated virtual antenna data and/or the interpolated virtual antenna data) to be generated in order to provide a high resolution of data based on the sparse physical antenna data. The virtual aperture imaging may enable a dense array of virtual antenna data to be provided in response to the sparse arrangement of the physical antennas implemented by one of the radar frontends 110a-110n. Details of the virtual aperture imaging may be described in association with U.S. application Ser. No. 18/129,834, filed on Apr. 1, 2023, U.S. application Ser. No. 17/832,278 filed on Jun. 3, 2022 (issued as U.S. Pat. No. 11,561,299), U.S. application Ser. No. 17/556, 221 filed on Dec. 20, 2021, U.S. application Ser. No. 16/704,409, filed Dec. 5, 2019 (issued as U.S. Pat. No. 11,243,304), U.S. application Ser. No. 16/503,908, filed Jul. 5, 2019 (issued as U.S. Pat. No. 10,564,277), U.S. application Ser. No. 16/032,369, filed Jul. 11, 2018 (issued as U.S. Pat. No. 10,509,119), and U.S. application Ser. No. 15/883, 372, filed Jan. 30, 2018 (issued as U.S. Pat. No. 10,048,366), appropriate portions of which are incorporated by reference.

Figure 3:
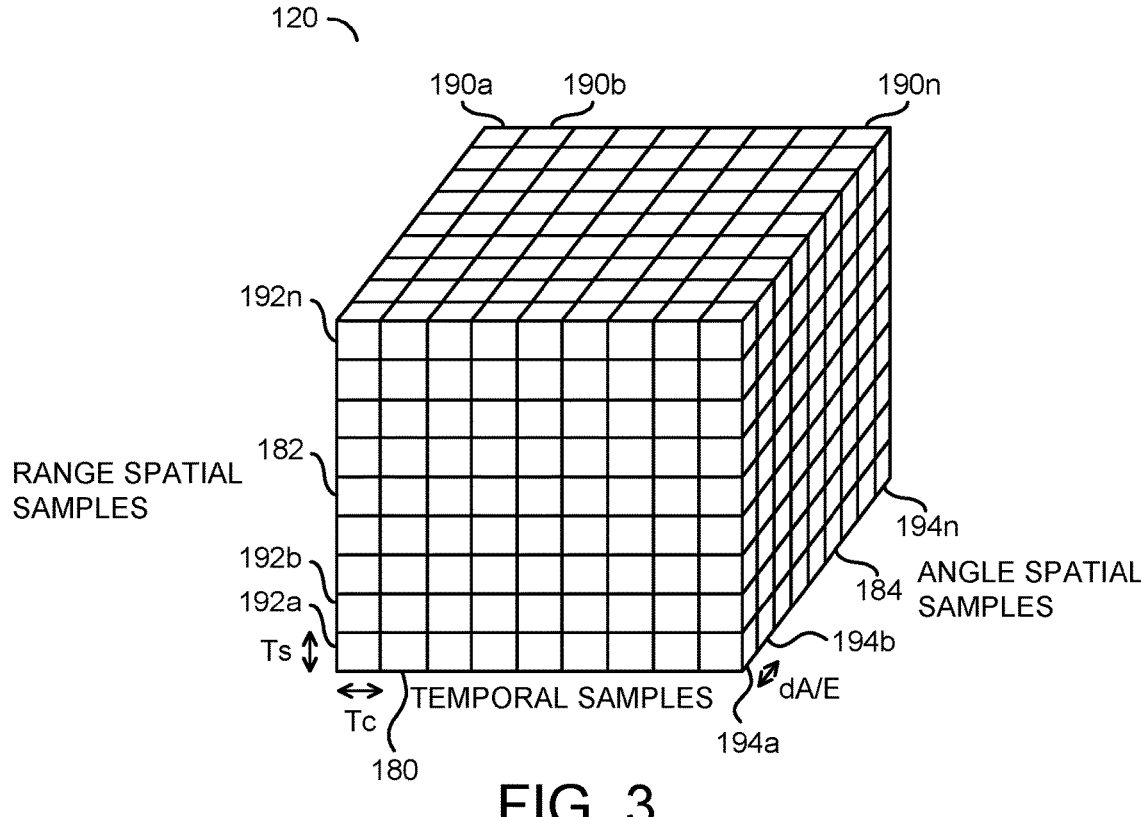
FIG. 3 is a diagram illustrating an example data cube.

Referring to FIG. 3, a diagram illustrating an example data cube is shown. The radar data cube 120 is shown. The frame output data FRAMEOUT may be a result of the processed data cube. For example, the radar data cube 120 may comprise the raw radar data generated by one of the radar frontends 110a-110n and the frame output data FRAMEOUT may be generated in response to processing the raw data. The radar data cubes 120 processed by the apparatus 100 may have a large size generated in response to a continuous stream of the raw radar data. In some embodiments, the radar data cubes 120 processed by the apparatus 100 may have a variable size.

The radar data cube 120 may conceptually represent space-time processing of the raw radar data generated by the radar frontends 110a-110n. For example, the processor 13 may be configured to convert the RF signals received from multiple pulses across multiple array elements to complex-valued baseband samples and then arrange the complex-valued baseband samples in a multi-dimensional array represented by the radar data cube 120. In some embodiments, the radar data cube 120 may comprise a 4D data cube in measurement space. The centralized processing device 102 may be configured to perform a Fast Fourier Transform operation to convert the radar data cube 120 from measurement space to physical unit space. The centralized processing device 102 may be configured to perform the radar signal processing operations on the radar data cube 120 in the measurement space and/or in the physical unit space.

The radar data cube 120 may comprise an axis 180, an axis 182 and/or an axis 184. The axis 180 may comprise a first dimension of the 4D data cube 120. The axis 182 may comprise a second dimension of the 4D data cube 120. The axis 184 may comprise a third dimension and a fourth dimension of the 4D data cube 120. In the measurement space, the axis 180 may comprise temporal samples. In the physical unit space, the axis 180 may comprise Doppler samples. In the measurement space and/or the physical unit space, the axis 182 may comprise range spatial samples. In the measurement space, the axis 184 may comprise azimuth/elevation spatial samples (K/L antennas). In the physical unit space, the axis 184 may comprise azimuth/elevation spatial samples (degrees/degrees).

The axis 180 may comprise a number of samples 190a-190n. The number of samples 190a-190n may each comprise a number of samples from a single pulse (or chirp) received at a single array element. In the measurement space, the number of samples 190a-190n may each comprise a temporal sample interval Tc. The number of samples 190a-190n may provide N samples per frame. In the physical unit space, the number of samples 190a-190n may each comprise one frame (measured in meters per second). With a fixed temporal sample interval Tc, the size of the axis 180 may determine separability (e.g., larger number N of the samples 190a-190n may provide a better Doppler resolution). The density of the axis 180 (e.g., the sampling size Tc of each of the number of samples 190a-190n) may determine the maximum velocity. For example, a smaller sample size Tc may result in a larger maximum velocity.

The axis 182 may comprise a number of samples 192a-192n. The number of samples 192a-192n may each comprise complex-valued baseband samples from a single pulse (or chirp). In the measurement space, the number of samples 192a-192n may comprise a sampling rate Ts. Generally, the sampling rate Ts may be selected to avoid aliasing. The number of samples 192a-192n may provide M samples. In the physical unit space, the number of samples 192a-192n may comprise a range in meters. With a fixed sampling rate Ts, the size of the axis 182 may determine separability (e.g., larger number M of the samples 192a-192n may provide better range resolution). The density of the axis 182 (e.g., the sampling rate Ts of each of the number of samples 192a-192n) may determine the maximum range. For example, a smaller sampling rate Ts may result in a larger maximum range.

The axis 184 may comprise a number of samples 194a-194n. The number of samples 194a-194n may each comprise complex-valued baseband samples from L different pulses (or chirps). In the measurement space, the number of samples 194a-194n may comprise azimuth/elevation antenna spacing dA/E. The number of samples 194a-194n may provide the azimuth/elevation spatial samples K/L antennas. In the physical unit space, the number of samples 192a-192n may comprise the azimuth/elevation spatial samples in degrees/degrees. The size of the of the axis 184 may determine separability (e.g., a larger K/L may provide better angle resolution). The density of the axis 194 (e.g., the dA/E of each of the number of samples 194a-194n) may determine the field of view. For example, a smaller dA/E may result in a larger angle/elevation field of view.

Generally, a homogeneity of the radar data cube 120 may determine a radar signal quality. More homogeneous data may provide better radar quality (e.g., smaller side lobes and ripples). If the data cubes 120 are each processed locally at the radar frontends 110a-110n, there may be an inherent conflict between Doppler resolution and the output frame rate for the frame output data FRAMEOUT. For example, with local processing at the radar frontends 110a-110n each data cube may be acquired and then processed before a next data cube may be acquired (e.g., an output frame rate may be inversely proportional to a frame interval). The conflict between Doppler resolution and the output frame rate may be a result of having a fixed processing time and the relationship between a larger N of the samples 190a-190n resulting in a larger frame interval, a larger frame interval resulting in a smaller output frame rate, which results in a small radar output volume throughput. Processing each of the data cubes locally at the radar frontends 110a-110n may result in data cube snapshots that have significant angle information difference and uncoherence.

The apparatus 100 may be configured to resolve the conflict between Doppler resolution and output frame rate (e.g., the resolution of frame output data being proportional to a size of the data cube processed and an output rate of the frame output data being inversely proportional to the size of the data cube processed). The apparatus 100 may be configured to receive a continuous stream of raw radar data from the radar frontends 110a-110n and interleave the raw radar data between subsequent data cubes. Interleaving the raw radar data in the data cubes 120 may provide continuous multi-look angle diversity. There may be limited variability between the subsequent data cubes, which may provide a coherency between for each data cube 120. In the phase domain, the different segments of each data cube 120 may be acquired from the continuous stream of the raw radar data in order to be coherent. By implementing the centralized processing device 102 to receive the continuous stream of the raw radar data, each data cube 120 processed may be coherent. Details of receiving and/or processing the continuous stream of raw radar data and/or interleaving the raw radar data may be described in association with U.S. patent application Ser. No. 18/140,958, file on Apr. 28, 2023, appropriate portions of which are incorporated by reference.

Figure 4:
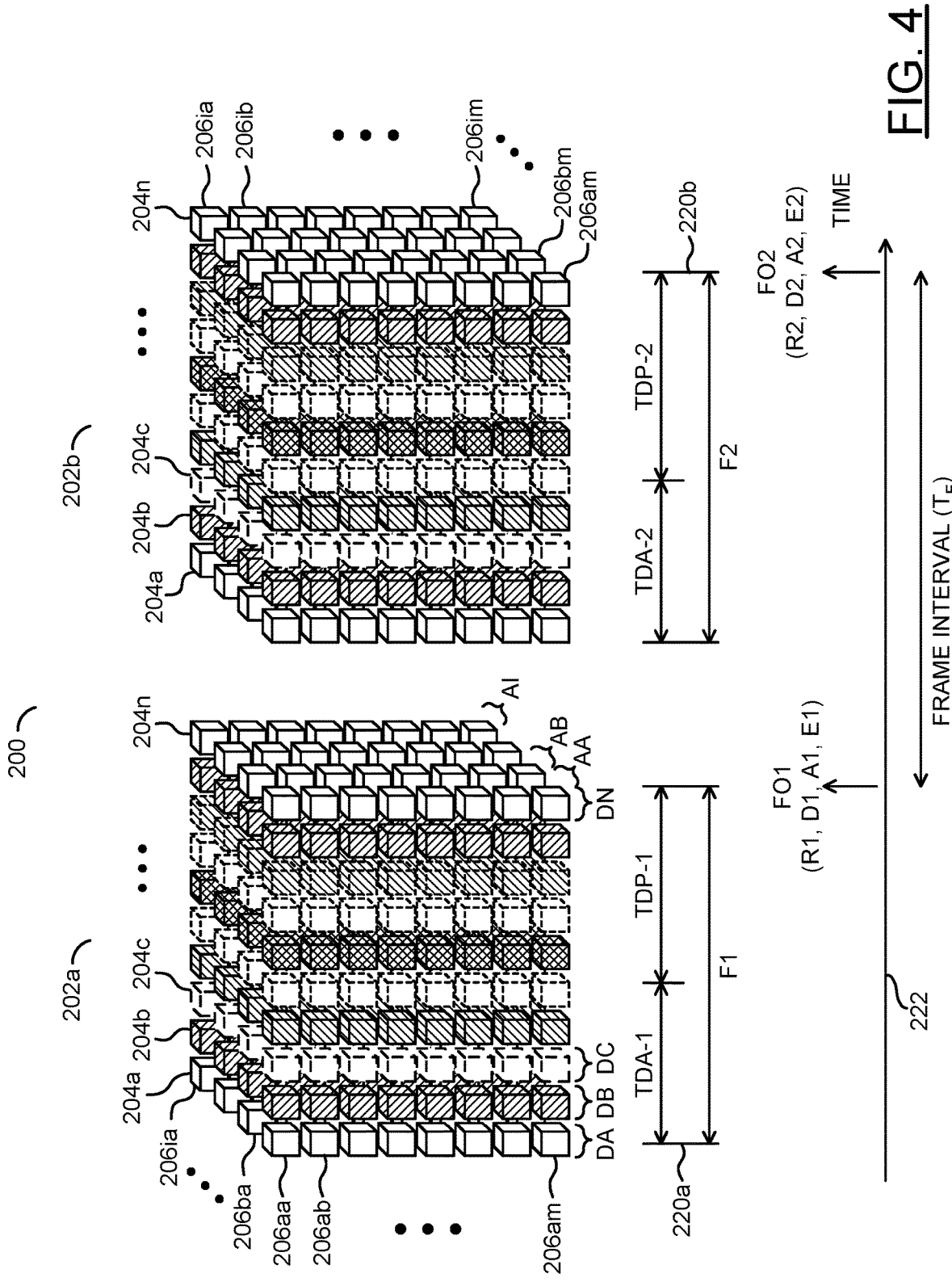
FIG. 4 is a diagram illustrating radar data cubes with interleaved profile configurations.

Referring to FIG. 4, a diagram illustrating radar data cubes with interleaved profile configurations is shown. Example raw radar data processing 200 are shown. The raw radar data processing 200 may comprise an interleaved data cube 202a and an interleaved data cube 202b. The interleaved data cubes 202a-202b may be received by one of the radar frontends 110a-110n and/or processed using interleaved radar data cube processing by the centralized processing device 102. In the example shown, the interleaved data cubes 202a-202b may comprise similar data. Generally, the data in the interleaved data cubes 202a-202b may be different (e.g., based on a different scenario and/or different objects in the environment 40, based on interference in the environment 40, based on different profile configurations used in the probe signals TX_A-TX_N, etc.). While only two of the interleaved data cubes 202a-202b are shown, the interleaved data cubes 202a-202b may be representative of any number of interleaved data cubes (e.g., interleaved data cubes 202a-202n) that may be received by the radar frontends 110a-110n and/or processed using the centralized processing device 102. For simplicity and/or a representative example, the data arrangement of the interleaved data cube 202a and data arrangement of the interleaved data cube 202b may be described as the same. The data arrangement of the interleaved data cubes 202a-202b may be varied according to the design criteria of a particular implementation.

The interleaved data cube 202a (and the interleaved data cube 202b) may comprise a number of profile configurations 204a-204n. Each of the profile configurations 204a-204n may be represented as a column plane in the interleaved data cube 202a. The profile configurations 204a-204n may be presented with the probe signals TX_A-TX_N and, after reflecting in the environment 40, may be received by the radar frontends 110a-110n in the interleaved data cubes 202a-202b. In some embodiments, the interleaved data cube 202a may comprise at least two of the profile configurations 204a-204n. In one example, the interleaved data cubes 202a-202b may comprise two of the profile configurations 204a-204n. In another example, the interleaved data cubes 202a-202b may comprise three of the profile configurations 204a-204n. In some embodiments, the interleaved data cube 202a may comprise three or more of the profile configurations 204a-204n. The number of profile configurations 204a-204n generated with the probe signals TX_A-TX_N may be the same as the number of the profile configurations 204a-204n received in the radar data cube 202a. The number of profile configurations 204a-204n implemented may be varied according to the design criteria of a particular implementation.

Each of the profile configurations 204a-204n are represented as a vertical plane in the interleaved radar data cube 202a. Each of the profile configurations 204a-204n may comprise a number of samples 206aa-206im. In the example shown, range spatial samples 206aa-206am of the profile configuration 204a, and angle spatial samples 206aa-206ia of the profile configuration 204a may be visible. The number of samples 206aa-206im in each of the profile configurations 204a-204n may be varied according to the design criteria of a particular implementation.

Each of the samples 206aa-206im may have a dimension D (e.g., DA-DN) and a dimension A (e.g., AA-AI). The dimensions AA-AI of the samples 206aa-206im may each be the same size (e.g., each of the samples 206aa-206im may be from the receivers 142 implemented with sparsity), but may be different in contents (e.g., since each of the receivers 142 may be implemented at different location). The D dimensions DA-DN for the samples 206aa-206im may correspond to a respective one of the configuration profiles 204a-204n. The dimensions DA-DN for the samples 206aa-206im may be the same or different in size depending on the bandwidth implemented by the particular profile configurations 204a-204n implemented.

The centralized processing device 102 may be configured to design the probe signals TX_A-TX_N with the profile configurations 204a-204n. Each of the profile configurations 204a-204n selected by the centralized processing device 102 may be interleaved in the probe signals TX_A-TX_N and may be received in the interleaved data cube 202a. The profile configurations 204a-204n may each comprise various characteristics of a waveform. In an example, the characteristics of a waveform that may be varied in the profile configurations 204a-204n may comprise frequency, phase, slope, gain, chirp period, sampling rate variations, etc. The centralized processing device 102 may be configured to interleave patterns of varying frequency, phase, slope, gain, chirp period, sampling rate variations, etc. (e.g., the characteristics of the waveform) in the profile configurations 204a-204n when generating the probe signals TX_A-TX_N. By interleaving the profile configurations 204a-204n, the radar data cubes 202a-202b received from the raw radar data reflected from the environment 40 may comprise the profile configurations 204a-204n. In response to the interleaved profile configurations 204a-204n, the centralized processing device 102 may be configured to resolve ambiguities in the information received about the environment 40, across several domains. By resolving the ambiguities across several domains, the centralized processing device 102 may be configured to reconstruct a high quality, single high dynamic range output (e.g., the signal FRAMEOUT shown in association with FIG. 2) losslessly.

The profile configurations 204a-204n are shown interleaved with each other in the data cubes 202a-202b. The profile configurations may comprise varying chirp profiles. Interleaving multiple of the chip profiles (e.g., the profile configurations 204a-204n) with each other, the apparatus 100 may be capable of analyzing the same real world environment 40 at the same instance in time, and each of the profile configurations 204a-204n may provide data that may be reported independent from each other. The profile configurations 204a-204n of the interleaved data cubes 202a-202b may provide multiple representations of a single scenario in the environment 40. Since the data from the profile configurations 204a-204n correspond to the same environment scenario at the same instance, but are also reported independent from each other, the resolution of various parameters (e.g., the maximum unambiguous Doppler, range resolution, angle ambiguity, maximum operational range, and processing gain) may be decoupled. For example, the various parameters may be resolved without sacrificing the accuracy of other of the parameters.

The raw data processing 200 may comprise frame output visualizations 220a-220b and a timeline 222. The frame output visualization 220a may correspond to the interleaved data cube 202a and the frame output visualization 220b may correspond to the interleaved data cube 202b. In the example shown, a gap is visible in between the interleaved data cube 202a and the interleaved data cube 202b (and the corresponding frame output visualizations 220a-220b). The gap is shown for illustrative purposes in order to visually distinguish the two interleaved data cubes 202a-202b. Generally, there may not be a time gap between the interleaved data cubes 202a-202b. In some embodiments, the STMS data integration may be implemented for the received raw radar data (e.g., continuous interleaving of data cubes).

The frame output visualization 220a may correspond to a processing time of a first frame (e.g., F1). The centralized processing device 102 may perform the interleaved radar data cube processing on the interleaved data cube 202a during the processing time for the first frame F1. The processing time for the first frame F1 may comprise a data acquisition time (e.g., TDA-1) and a data processing time (e.g., TDP-1).

The frame output visualization 220b may correspond to a processing time of a second frame (e.g., F2). The centralized processing device 102 may perform the interleaved radar data cube processing on the interleaved data cube 202b during the processing time for the second frame F2. The processing time for the second frame F2 may comprise a data acquisition time (e.g., TDA-2) and a data processing time (e.g., TDP-2). In some embodiments, the centralized processing device 102 may select different profile configurations 204a-204n for each frame (e.g., one set of profile configurations 204a-204n for the first frame F1 and another set of profile configurations 204a-204n for the second frame F2).

The timeline 222 may provide a reference for the processing time for the first frame F1 and the processing time for the second frame F2. An arrow F01 and an arrow F02 are shown on the timeline 222. The arrow F01 may represent a time that the frame output for the interleaved data cube 202a is generated and the arrow F02 may represent a time that the frame output for the interleaved data cube 202b is generated. The frame output F01 may be presented after the data processing time TDP-1. The frame output F02 may be presented after the data processing time TDP-2. The frame output F01 may comprise multiple datapoints (e.g., R1, D1, A1 and E1) and the frame output may comprise similar datapoints (e.g., R2, D2, A2 and E2). Generally, the datapoints may correspond to a range (e.g., a distance between the receivers 142 and a target where each of the range spatial samples 206aa-206am may corresponds to a different range bin), a Doppler (e.g., a change in frequency of the radar signal due to the motion of the target, where Doppler may be estimated in a slow-time dimension to enable an estimation of the Doppler spectrum at a given range bin), an angle (e.g., a direction of the target relative to the receivers 142, where a two-dimensional angle-Doppler data for each range bin may be analyzed in space-time adaptive processing) and elevation (e.g., an angle between the target and a horizontal plane).

A double ended arrow (e.g., Tf) is shown. The double ended arrow Tf may represent a frame interval. The frame interval Tf may be an amount of time from the frame output F01 and the frame output F02. In the example shown, with the visual gap between the interleaved data cubes 202a-202b, the frame interval Tf may appear longer than the actual time of the frame interval Tf. Generally, the frame interval Tf may comprise the amount of time for the data acquisition time TDA-2 and the amount of time for the data processing time TDP-2. In some embodiments, where spatial temporal multi-snapshot data integration is performed, the frame interval Tf may be smaller (e.g., since data acquisition between a first frame and a second frame may overlap). During the processing time (e.g., TDP-1 and TDP-2) the centralized processing device 102 may be configured to resolve ambiguities across multiple domains based on the interleaved profile configurations 204a-204n in order to generate the frame outputs F01-F02.

Figure 5:
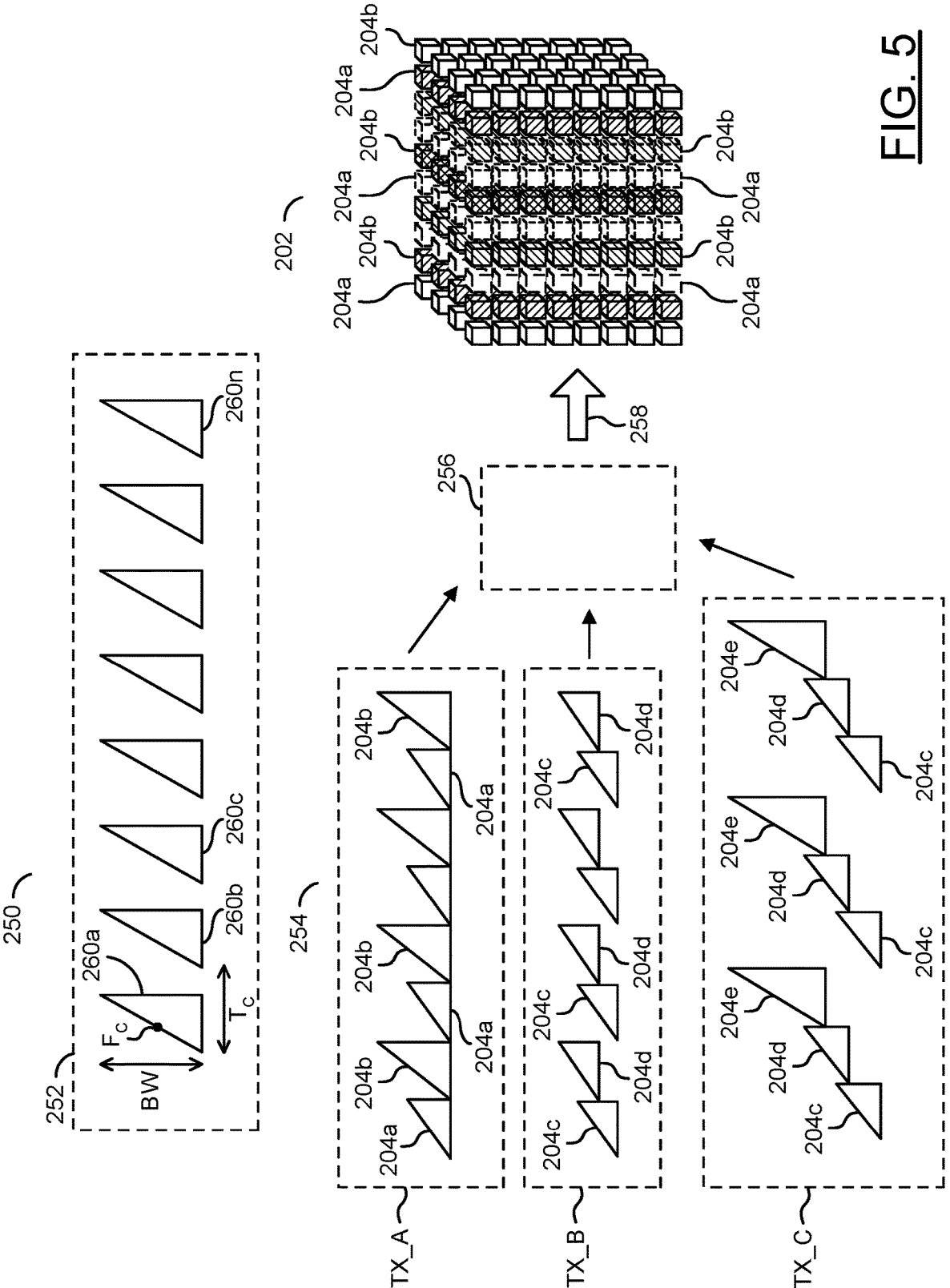
FIG. 5 is a diagram illustrating generating probe signals with interleaved profile configurations.

Referring to FIG. 5, a diagram illustrating generating probe signals with interleaved profile configurations is shown. A visualization of probe signals 250 is shown. The visualization 250 may comprise an example probe signal 252, interleaved probe signals 254, a target object 256, a reflection 258 and the interleaved data cube 202. The interleaved data cube 202 may be an example of one of the interleaved data cubes 202a-202b shown in association with FIG. 4.

The example probe signal 252 may be an example of a probe signal presented in the output signals TX_A-TX_N generated by the transmitters 140. The example probe signal 252 may comprise a number of shapes 260a-260n. The shapes 260a-260n may be illustrative examples of chirps. For example, the probe signal 252 may communicate a number of the chirps 260a-260n. In the example shown, each of the chirps 260a-260n are represented as a right angle triangle. In the example probe signal 252, each of the chirps 260a-260n may be uniform (e.g., the example probe signal 252 may repeat the chirps 260a-260n with the same waveform properties and/or characteristics). For example, the example probe signal 252 may be an example without interleaving multiple profile configurations. The number of chirps 260a-260n implemented in the example probe signal 252 may be varied according to the design criteria of a particular implementation.

A number of characteristics of the chirps 260a are shown. A double ended arrow (e.g., BW), a double ended arrow (e.g., Tc) and a point (e.g., Fc) are illustrated on the chirp 260a. The arrow BW may illustrate the bandwidth of the chirp 260a. The arrow Tc may illustrate the interchirp time Tc. The point Fc may represent a center frequency of the chirp 260a. The bandwidth BW, the interchirp time Tc and the center frequency Fc may comprise characteristics of the waveform of the probe signal 252. Generally, single frame radar performance may be completely determined by the characteristics of the waveform used to collect the radar cube. In the example probe signal 252, the characteristics of the waveform may be the same for each of the chirps 260a-260n.

In the example shown, the characteristic of bandwidth BW may be represented by a height of the triangle of the chirps 260a-260n. In the example shown, the characteristic of interchirp time Tc may be an amount of time from the beginning of one chirp to the beginning of the next chirp (e.g., an amount of time from the start of the chirp 260a until the start of the chirp 260b). In the example shown, the characteristic of center frequency Fc may be a center of a frequency sweep range of the chirps 260a-260n.

The characteristics of the waveform(s) of the probe signals TX_A-TX_N may determine various features reported about the environment 40 in response to the received signals RX_A-RX_N. The bandwidth BW characteristic of the chirps 260a-260n may be used to determine a maximum unambiguous range feature of targets (e.g., the object 256) in the environment 40. The center frequency Fc characteristic may be used to determine a maximum unambiguous direction of arrival feature, given the fixed antenna structure of the radar frontends 110a-110n. The interchirp time Tc characteristic and the center frequency Fc characteristic may be used to determine the maximum unambiguous Doppler feature of the targets.

For the example probe signal 252 with uniform chirp characteristics, when properties (or features) of the physical target 256 are beyond unambiguous boundaries, the target 256 may be reported incorrectly as being within the values of the unambiguous boundaries. If the interleaved profile configurations 204a-204n are not implemented, then tradeoffs of the accuracy of the various features may be used to resolve issues with the unambiguous boundaries. For example, tradeoffs of accuracy within one or more features such as the range, Doppler, angle and elevation dimensions may be implemented to increase ambiguity boundaries at the cost of accuracy in other dimensions. In one example, reducing the bandwidth BW may provide a shorter interchirp time Tc, which may result in higher unambiguous Doppler at the cost of a smaller unambiguous range resolution. Similarly, if interleaved profile configurations 204a-204n are not implemented, then resolving across data cubes collected in bursts, frames, and/or sub-periods may be used to resolve issues with unambiguous boundaries. However, resolving across data cubes collected in bursts, frames and/or sub-periods may involve consideration of changes in the environment 40 across time and/or a feedback loop across time. As the environment 40 becomes too complex to be tracked across frames, resolving across data cubes collected in bursts, frames, and/or sub-periods may fail.

The centralized processing device 102 may be configured to adjust and/or vary the characteristics of the chirps 260a-260n within the probe signals TX_A-TX_N. For example, the centralized processing device 102 may alternate between a number sets of pre-defined characteristics of the chirps 260a-260n. Each of the pre-defined characteristics of the chirps 260a-260n may be one of the profile configurations 204a-204n. The characteristics of the waveforms for each of the profile configurations 204a-204n may comprise the bandwidth BW, the interchirp time Tc, the center frequency Fc, frequency, phase, slope, gain, chirp period, sampling rate variations, etc. The characteristics of the probe signals TX_A-TX_N may enable the centralized processing device 102 to resolve the features of the environment 40 and/or the object 256. The features may comprise a range, a Doppler, a field of view for angles of arrival, an elevation, a size, etc. The number of characteristics that may be varied, the amount the characteristics may be varied, and/or the number of features reported may be varied according to the design criteria of a particular implementation.

The visualization of the probe signals 250 may illustrate data acquisition for interleaved radar data cube processing. The interleaved probe signals 254 are shown. In the example shown, the interleaved probe signals 254 may comprise three probe signals TX_A-TX_C. Each of the probe signals TX_A-TX_C may comprise more than one of the profile configurations 204a-204n. One of the interleaved probe signals TX_A-TX_C may be transmitted by the transmitters 140 to the target object 256 in the environment 40 during a time frame. In one example, the centralized processing device 102 may select a different one of the probe signals TX_A-TX_C for each time frame (e.g., the probe signal TX_A may be sent for the frame F1, the probe signal TX_B may be sent for the frame F2). In another example, the processing device 102 may select the same one of the probe signals TX_A-TX_C for each time frame (e.g., the probe signal TX_C may be sent for the frame F1 and the probe signal TX_C may be sent for the frame F2). The selection of the probe signals TX_A-TX_N for each of the frames may be varied according to the design criteria of a particular implementation.

The transmitted signals TX_A-TX_N hitting the target object 256 may result in the reflection 258. The reflection 258 may result in the received signals RX_A-RX_N. The received signals RX_A-RX_N may comprise the raw radar data that may be received at the receivers 142. When the transmitted signals TX_A-TX_N comprise the interleaved profile configurations 204a-204n, the raw radar data may comprise the interleaved data cube 202. The interleaved data cube 202 may be analyzed by the centralized processing device in order to reconstruct a radar output (e.g., the signal FRAMEOUT) based on the profile configurations 204a-204n.

The characteristics of a transmitted radar signal (e.g., the probe signals TX_A-TX_N) may be detected in the reflected signals (e.g., the received signals RX_A-RX_N) by the centralized processing device 102 analyzing the signal characteristics. In an example, the carrier frequency of the probe signals TX_A-TX_N may be known when communicated and may be the same in the received signals TX_A-TX_N. In another example, the duration of the transmitted pulse (e.g., pulse width) may be known and the reflected signal may have the same pulse width. In yet another example, a pulse repetition frequency (e.g., a rate that the pulses are transmitted) may be known and the reflected signal may have the same pulse repetition frequency. The received signals may further comprise noise caused by reflections from the environment 40 (e.g., the ground, buildings, etc.) that may be filtered out. Generally, the reflected signals RX_A-RX_N may have a longer duration than the transmitted signals TX_A-TX_N and/or may have a different polarization. The centralized processing device 102 may be configured to detect the characteristics in the reflected signals using radar signal processing. The resulting signal may be analyzed and the features of the object 256 may be extracted.

Acquiring the interleaved radar data cube 202 may comprise transmitting chirps with varying characteristics in an alternating manner. Transmitting the chirps with varying characteristics in an alternating manner may enable a different representation of the same scenario (e.g., the target 256 in the environment 40) to be acquired by the apparatus 100. In one example, by varying the characteristics, the chirps 260a-260n may have different bandwidths BW. Having the chirps 260a-260n with different bandwidths BW may enable a difference in the maximum unambiguous range to be reported with each of the profile configurations 204a-204n. For example, range ambiguity may occur when the range of the object 256 exceeds the maximum unambiguous range of the system. The maximum unambiguous range may be the maximum range that may be measured without range ambiguities. When the range of the object 256 exceeds the maximum unambiguous range, a radar system may not be able to distinguish between the true range and multiples of the maximum unambiguous range. In another example, by varying the characteristics, the chirps 260a-260n may have a varying center frequency Fc. Having chirps with a varying center frequency Fc may enable a difference in the maximum unambiguous Doppler and field of view to be reported by each of the profile configurations 204a-204n. In yet another example, by varying the characteristics, the chirps 260a-260n may have a varying center frequency Fc and different bandwidths BW. Having chirps with varying center frequencies Fc and different bandwidths BW may enable a difference in the maximum unambiguous range, Doppler and field of view to be reported by each of the profile configurations 204a-204c. The type and/or amount of variation of each of the characteristics of the chirps 260a-260n in each of the profile configurations 204a-204n may be varied according to the design criteria of a particular implementation.

The interleaved probe signal TX_A may comprise the chirps 260a-260n having two alternating profile configurations (e.g., 204a-204b). The chirps 260a-260n with the profile configurations 204a may alternate with the chirps 260a-260n with the profile configurations 204b (e.g., first, a chirp with the profile configuration 204a may be generated, then a chirp with the profile configuration 204b, then a chirp with the profile configuration 204a, then a chirp with the profile configuration 204b, etc.). In the example shown, the chirps with the profile configuration 204a may have a smaller bandwidth BW and lower center frequency Fc than the chirps with the profile configurations 204b and interchirp times Tc of the chirps with the profile configurations 204a and chirps with the profile configuration 204b may be similar. Generally, the next one of the chirps with one of the profile configurations 204a-204b may be presented immediately after the end of the one of the chirps with the other of the profile configurations 204a-204b.

The interleaved probe signal TX_B may comprise the chirps 260a-260n having two alternating profile configurations (e.g., 204c-204d). The chirps 260a-260n with the profile configurations 204c may alternate with the chirps 260a-260n with the profile configurations 204d (e.g., first, a chirp with the profile configurations 204c may be generated, then a chirp with the profile configuration 204d, then a chirp with the profile configuration 204c, then a chirp with the profile configuration 204d, etc.). In the example shown, the chirps with the profile configuration 204c and the profile configuration 204d may have a similar bandwidth BW and a similar interchirp time and the chirps with the profile configuration 204c may have a lower center frequency Fc than the chirps with the profile configuration 204d. Generally, the next one of the chirps with one of the profile configurations 204c-204d may be presented immediately after the end of the one of the chirps with the other of the profile configurations 204c-204d.

The probe signal TX_C may comprise chirps 260a-260n having three alternating profile configurations (e.g., 204c-204e). The chirps 260a-260n with the profile configuration 204c, the chirps 260a-260n with the profile configuration 204d and the chirps 260a-260n with the profile configuration 204e may alternate in sequence (e.g., first, the chirp with the profile configuration 204c may be generated, then the chirp with the profile configuration 204d, then the chirp with the profile configuration 204e, then the chirp with the profile configuration 204c, then the chirp with the profile configuration 204d, then the chirp with the profile configuration 204e, etc.). In the example shown, the chirps with the profile configurations 204c-204d may have a similar bandwidth BW and a similar interchirp time and the chirps with the profile configuration 204d may have a higher center frequency Fc than the chirps with the profile configuration 204c. The chirps with the profile configuration 204e may have a larger bandwidth and a higher center frequency than both the chirps with the profile configuration 204c and the chirps with the profile configuration 204d. The interchirp times Tc of the chirps with the profile configurations 204c-204e may be similar. Generally, the next one of the chirps with the profile configuration 204d may be presented immediately after the end of the one of the chirps with the profile configuration 204c, the next one of the chirps with the profile configuration 204e may be presented immediately after the end of one of the chirps with the profile configuration 204d and a next one of the chirps with the profile configuration 204c may be presented immediately after the end of one of the chirps with the profile configuration 204e.

In the example shown, the centralized processing device 102 may select the probe signal TX_A. The interleaved data cube 202 may be generated in response to the received signal RX_A reflected from the object 256. The interleaved data cube 202 may comprise the profile configurations 204a-204n that correspond to the profile configurations 204a-204n interleaved in the particular probe signal transmitted. Since the probe signal TX_A comprises the interleaved profile configurations 204a-204b, then the interleaved data cube 202 may comprise the interleaved profile configurations 204a-204b. In the example shown, the interleaved data cube 202 may comprise column planes that alternate with the profile configurations 204a-204b. In another example (e.g., a next frame), the centralized processing device 102 may select the probe signal TX_B with the interleaved profile configurations 204c-204d and then the interleaved data cube 202 generated may comprise column planes that alternate with the profile configurations 204c-204d. In yet another example, the centralized processing device 102 may select the probe signal TX_C with the interleaved profile configurations 204c-204e and then the interleaved data cube 202 generated may comprise column planes that alternate with the profile configurations 204c-204e.

The profile configurations 204a-204n may be selected by the centralized processing device 102. For example, the centralized processing device 102 may select a combination of the profile configurations 204a-204n to transmit with the probe signals TX_A-TX_N for each frame interval Tf. In some embodiments, the chirps 260a-260n of the probe signals TX_A-TX_N may be randomized with different pattern variations to avoid interference (e.g., as described in association with U.S. application Ser. No. 17/323,334, filed on May 18, 2021, appropriate portions of which are incorporated by reference). Implementing the profile configurations 204a-204n may comprise generating different patterns that may be pre-defined for extracting and/or validating information about the object 256. For example, the memory 132 may store a set and/or a list of profile configurations 204a-204n. The list of profile configurations may be a tailored and/or specifically designed to extract and/or validate specific types of data (e.g., the radar resolution, the maximum operational range, the angular ambiguity, the maximum unambiguous Doppler, the processing gain, etc.). The processor 130 may select one or more of the profile configurations 204a-204n to be used as the chirps 260a-260n of the probe signals TX_A-TX_N. In one example, the profile configurations 204a-204n may be selected from the list of profile configurations 204a-204n based on environmental conditions. In another example, the profile configurations 204a-204n may be selected from the list of profile configurations 204a-204n based on a pre-determined order. In yet another example, the profile configurations 204a-204n may be selected from the list of profile configurations 204a-204n in response to an analysis of the interleaved data cube 202 from a previous frame. The method of selection and/or the order of the selection of the profile configurations 204a-204n may be varied according to the design criteria of a particular implementation.

Selecting the profile configurations 204a-204n may enable ambiguities in data about the environment 40 and/or the object 256 to be resolved without adding latency and/or errors. The different profile configurations 204a-204n may provide different combinations of the chirps 260a-260n for cross-matching that may be separated by one or a few of the chirps 260a-260n (e.g., a relatively small number of chirps instead of being separated by one or a few frames). Since the chirps 260a-260n with the different profile configurations 204a-204n may carry information that may be temporally close (e.g., data carried at almost the same time), the information may be calculated by the centralized processing device 102 as if the information has been received at the same time. Interpreting the information carried at the same time may enable the ambiguities to be resolved without adding latency (e.g., without waiting for a next frame). The centralized processing device 102 may independently process the information carried by the reflections that correspond to the profile configurations 204a-204n of the same environmental conditions at the same time.

Figure 6:
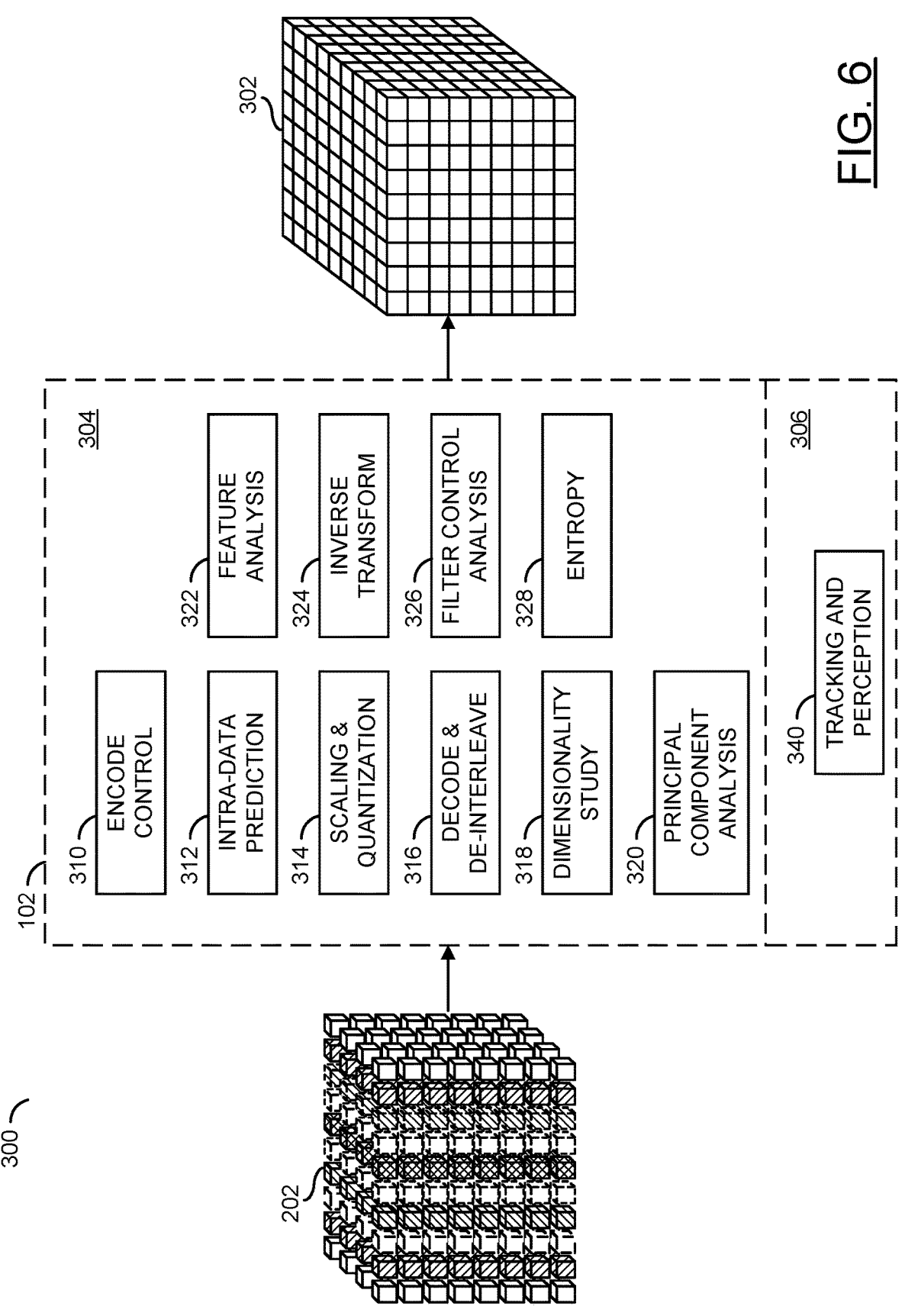
FIG. 6 is diagram illustrating interleaved data cube processing to resolve a high resolution radar output.

Referring to FIG. 6, a diagram illustrating interleaved data cube processing to resolve a high resolution radar output is shown. Interleaved radar data cube processing input/output 300 is shown. The interleaved radar data cube processing input/output 300 may comprise the raw radar data (e.g., the interleaved data cube 202), the centralized processing device 102 and/or the output data cube 302. The output data cube 302 may have a data arrangement similar to the data cube 120 shown in association with FIG. 3. The output data cube 302 may be a lossless, high quality, single, high dynamic range output data cube. The output data cube 302 may be communicated as the signal FRAMEOUT. The signal FRAMEOUT may be radar output that may comprise information about the environment 40.

The interleaved data cube 202 may be generated by the receivers 142 in response to the raw radar data received in the signals RX_A-RX_N. The interleaved data cube 202 may be presented to the centralized processing devices 102. The centralized processing device 102 may be configured to perform radar signal processing.

The centralized processing device 102 is shown comprising a block (or circuit) 304 and/or a block (or circuit) 306. The block 304 may be configured to implement interleaved radar data cube processing. The block 306 may be configured to implement application level ambiguity processing. The blocks 304-306 may be implemented using a combination of the processor 130 and the memory 132. The centralized processing device 102 may comprise other components and/or conceptual blocks (not shown). The number, type and/or arrangement of the components and/or conceptual blocks of the centralized processing device 102 may be varied according to the design criteria of a particular implementation.

The interleaved radar data cube processing 304 may be configured to interleave the profile configurations 204a-204n into the probe signals TX_A-TX_N. For example, the interleaved radar data cube processing 304 may be configured to select features and/or characteristics of the waveforms used to generate the probe signals TX_A-TX_N. Interleaving the profile configurations 204a-204n into the probe signals TX_A-TX_N may enable the raw radar data to be received as the interleaved data cube 202 comprising information about the environment 40 corresponding to each of the profile configurations 204a-204n at one time frame (e.g., the frame F1). The interleaved radar data cube processing 304 may be configured to reconstruct the radar output (e.g., the output data cube 302) based on the profile configurations 204a-204n in response to the raw radar data (e.g., the interleaved data cube 202). Interleaving the profile configurations 204a-204n may enable the centralized processing device 102 to extract the information about the environment 40 corresponding to each of the profile configurations 204a-204n independent from each other.

The interleaved radar data cube processing 304 may comprise a block (or circuit) 310, a block (or circuit) 312, a block (or circuit) 314, a block (or circuit) 316, a block (or circuit) 318, a block (or circuit) 320, a block (or circuit) 322, a block (or circuit) 324, a block (or circuit) 326, and/or a block (or circuit) 328. The block 310 may implement an encoder control. The block 312 may implement intra-data prediction. The block 314 may implement scaling and/or quantization. The block 316 may implement decode and/or de-interleaving. The block 318 may implement dimensionality study. The block 320 may implement principal component analysis. The block 322 may implement feature analysis. The block 324 may implement an inverse transform. The block 326 may implement filter control analysis. The block 328 may implement entropy. The blocks 304-328 may implement various functionality for the interleaved radar data cube processing 304. In some embodiments, one or more of the blocks 304-328 may be independent modules and/or circuitry. In some embodiments, one or more of the blocks 304-328 may be conceptual blocks implemented by the processor 130 and/or the memory 132. The interleaved radar data cube processing 304 may comprise other components (not shown). The number, type and/or arrangement of the components of the interleaved radar data cube processing 304 may be varied according to the design criteria of a particular implementation.

The encode control module 310 may be configured to select the profile configurations 204a-204n for each of the probe signals TX_A-TX_N and/or interleave the profile configurations 204a-204n selected into the probe signals TX_A-TX_N. The encode control module 310 may be a feedback based control block used for dynamic change of phases and/or other parameters of signal pulses (e.g., the chirps 260a-260n). The intra-data prediction module 312 may be configured to determine a relationship between the independent data generated by each of the profile configurations and/or predict data results that may be lost due to interference. In an example, the intra-data prediction module 312 may provide a prediction of data between samples using sine functions and/or other functions. The scaling and/or quantization module 314 may be configured to scale data received to common dimensions and/or map data to discrete values to enable the data to be processed using a common basis. The scaling and/or quantization module 314 may provide a variable measurement scale configured to identify the relationship between variables. The scaling and/or quantization module 314 may produce an order of variables.

The decode and/or interleaving module 316 may be configured to decode the raw radar data in the signals RX_A-RX_N and/or deinterleave the independent data that corresponds to the multiple profile configurations 204a-204n in the interleaved data cube 202. The decode and/or interleaving module 316 may decode each block of interleave sequences using known input encode patterns. The dimensional study module 318 may be configured to map various features generated in response to the profile configurations 204a-204n to the same dimension and/or map common features. The dimensional study module 318 may provide a study of joint dimensionality using reduction adaptive processing methods. The principal component analysis module 320 may be configured to classify and/or extract information from high-dimensional data sets. For example, the principal component analysis module 320 may implement a pre-processing step before clustering in order to reduce the dimensionality of data and/or prevent data loss. The principal component analysis module 320 may implement a dimensionality reduction method that may be used to reduce the dimensionality of large input data.

The feature analysis module 322 may be configured to compare various common features and/or uncommon features between the results reported that correspond to the various profile configurations 204a-204n. The feature analysis module 322 may perform an analysis of particular features of interest to find a correlation between variables. The inverse transformation module 324 may be configured to implement various mathematical transformation operations that may enable features to be compared on a common scale and/or dimension. The inverse transformation module 324 may be configured to undo a transformation in order to identify feature correctness. The filter control analysis module 326 may be configured to determine which data represents valid data points and/or which data represents noise that may be filtered out. The filter control analysis module 326 may be further configured to artificially create noise characteristics as part of the profile configurations 204a-204n. For example, the filter control analysis module 326 may analyze and improve performance of the central processing device 102 using matched filter techniques. The entropy module 328 may be configured to sort and/or recognize different types of radar signals based on a probability distribution. In an example, the entropy module 328 may analyze entropy features of radar signals that may be constructed into two-dimensional vectors.

The application level ambiguity processing 306 may comprise a block (or circuit) 340. The block 340 may implement a tracking and perception layer. The application level ambiguity processing 306 may comprise other components (not shown). The tracking and perception layer 340 may be configured to implement ambiguity handling for the various characteristics of the radar output data 302 at a higher level than the interleaved radar data cube processing 304. In one example, the tracking and perception layer 340 may be an application level process.

Figure 7:
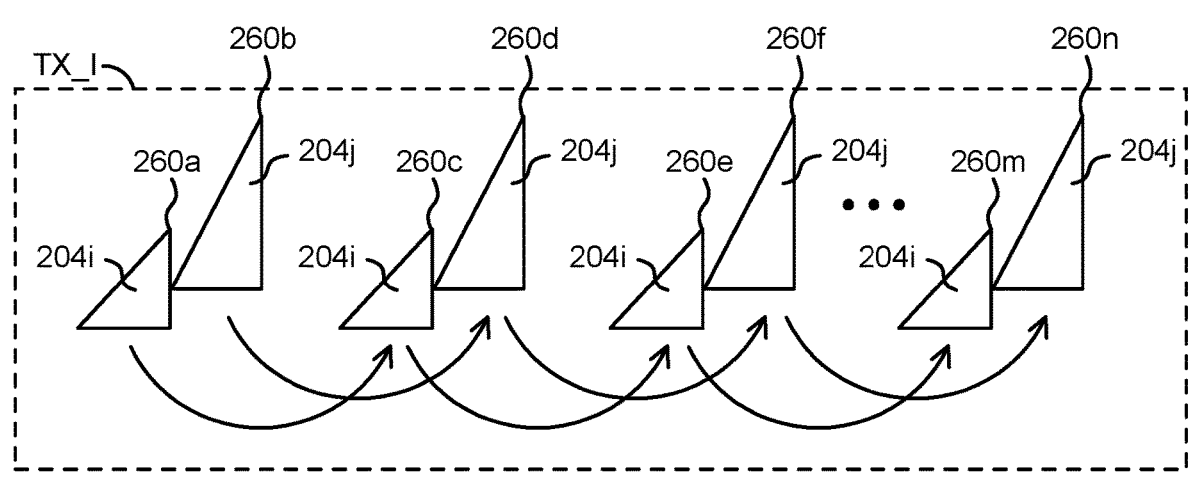
FIG. 7 is a diagram illustrating generating a probe signal to determine different unambiguous bounds of a parameter.
Figure 7:
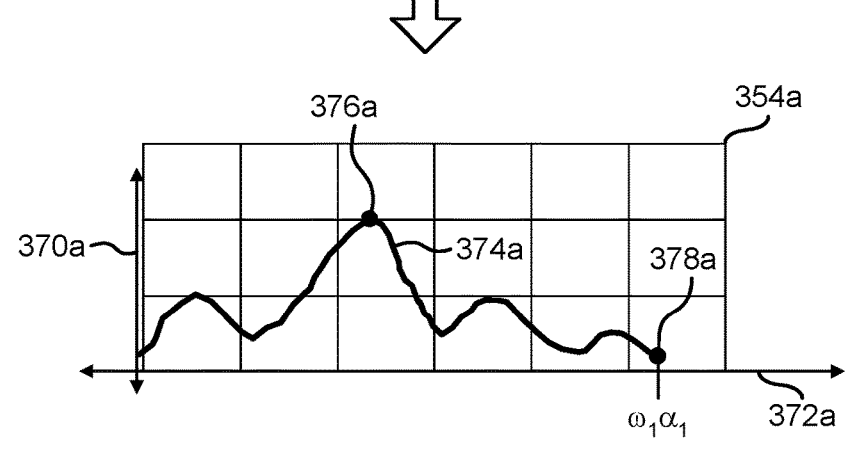
Figure 7:
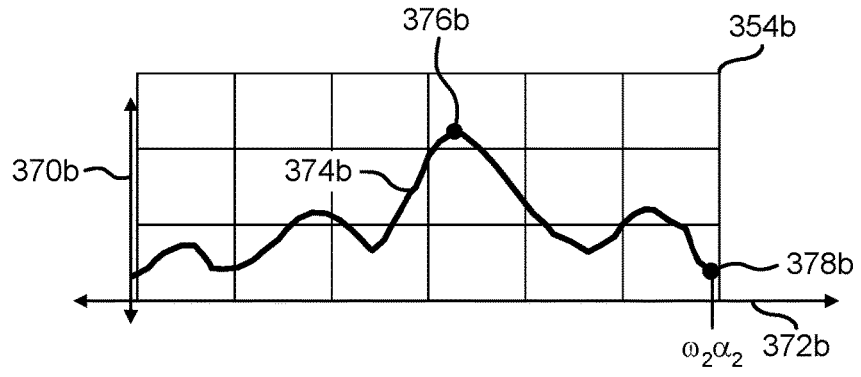

Referring to FIG. 7, a diagram illustrating generating a probe signal to determine different unambiguous bounds of a parameter is shown. A parameter resolution process 350 is shown. The parameter resolution process 350 may be configured to determine different unambiguous bounds of the characteristics of the profile configurations 204a-204n of the interleaved radar data cube 202. The parameter resolution 350 may comprise the probe signal TX_I, an analysis and/or transformation 352 and/or graphs 354a-354b.

The probe signal TX_I may comprise the chirps 260a-260n with an alternating pattern of the profile configurations 204i-204j. A subset of the chirps 260a-260n that have the profile configuration 204i may have a smaller bandwidth BW and a lower center frequency Fc than a subset of the chirps 260a-260n that have the profile configuration 204j. The interchirp time Tc may be similar between the profile configuration 204i and the profile configuration 204j. The probe signal TX_I may be reflected off the object 256 and received (e.g., as the received signal RX_I) as part of the interleaved data cube 202 and extracted using the decoding and/or deinterleaving module 316. The feature analysis module 322 and/or the inverse transformation module 324 may be configured to perform a frequency analysis and/or other transformations of the analysis 352. The analysis 352 may be configured to extract various features reported in response to the profile configurations 204i-204j. The extracted features are shown graphically in the graphs 354a-354b.

The graphs 354a-354b may comprise respective axes 370a-370b and respective axes 372a-372b. The axes 370a-370b may be Y-axes and the axes 372a-372b may be X-axes. The axes 370a-370b may represent a measure of Doppler. The axes 372a-372b may represent a measure of frequency. Respective plots 374a-374b are shown on the graphs 354a-354b. The respective plots 374a-374b may illustrate the Doppler over a range of frequencies. In an example, the plot 374a may represent the Doppler reported in response to the chirps 260a-260n with the profile configuration 204i and the plot 374b may represent the Doppler reported in response to the chirps 260a-260n with the profile configuration 204j measured independently of the same scene at the same time in the environment 40. Respective points 376a-376b and respective points 378a-378b are shown on the plots 376a-376b. The point 376a may represent a peak Doppler value of the plot 374a for the profile configuration 204i and the point 378a may represent a Doppler value (e.g., $\omega 1$, $\alpha 1$). The point 376b may represent a peak Doppler value of the plot 374b for the profile configuration 204j and the point 378b may represent a Doppler value (e.g., $\omega 2$, $\alpha 2$).

In the example shown, two independent waveforms may be reported in response to the chirps 260a-260n with the profile configuration 204i the chirps 260a-260n with the profile configuration 204j of the probe signal TX_I. The encode control module 310 may be configured to design the waveforms TX_A-TX_N such that a maximum unambiguous Doppler reported may be different in response to the profile configuration 204i and the profile configuration 204j (e.g., as shown in the plots 374a-374b). Since the features may be reported independently, based on the true Doppler of the target 256, the peak Doppler values 376a-376b may be reported differently in the corresponding frequency analysis. The differences may be resolved in further parameter resolution processes (e.g., to be described in association with FIGS. 8-11). Generally, the centralized processing device 102 may be configured to interleave the profile configurations 204a-204n to enable one feature to reported in response to some of the profile configurations 204a-204n (e.g., a subset) to be different.

Figure 8:
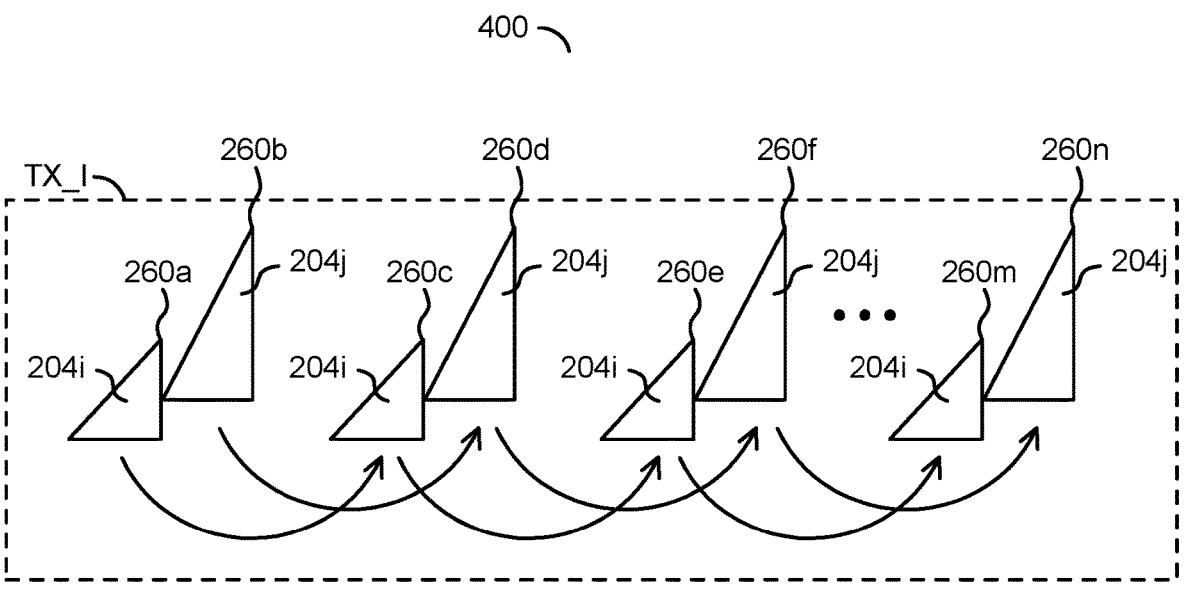
FIG. 8 is a diagram illustrating determining common features based on the profile configurations of a probe signal.
Figure 8:
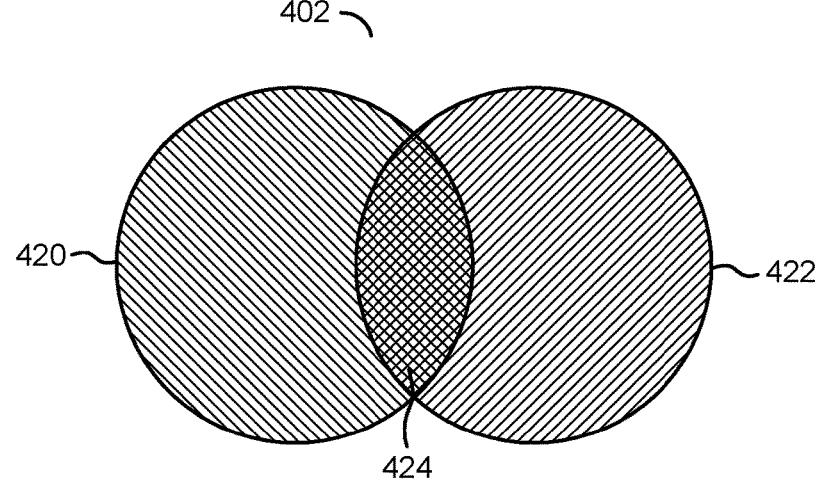

Referring to FIG. 8, a diagram illustrating determining common features based on the profile configurations of a probe signal is shown. A parameter resolution process 400 is shown. The parameter resolution process 400 may be configured to determine feature space definitions of the characteristics of the profile configurations 204a-204n of the interleaved radar data cube 202. The parameter resolution 400 may comprise the probe signal TX_I, and/or a representation of features 402.

The probe signal TX_I may comprise the chirps 260a-260n with an alternating pattern of the profile configurations 204i-204j. A subset of the chirps 260a-260n that have the profile configuration 204i may have a smaller bandwidth BW and a lower center frequency Fc than a subset of the chirps 260a-260n that have the profile configuration 204j. The interchirp time Tc may be similar between the profile configuration 204i and the profile configuration 204j. The probe signal TX_I may be reflected off the object 256 and received (e.g., as the received signal RX_I) as part of the interleaved data cube 202 and extracted using the decoding and/or deinterleaving module 316. For example, the probe signal TX_I may be the same probe signal TX_I described in association with FIG. 7. The feature analysis module 322 and/or the inverse transformation module 324 may be configured to compare the reported features in the representation of features 402.

The representation of features 402 may comprise a circle 420 and a circle 422. The circle 420 and the circle 422 may partially overlap each other in the overlapped region 424. For example, the circle 420 may comprise specific features reported corresponding to a first profile configuration (e.g., the chirps 260a-260n that have the profile configuration 204i) and the circle 422 may comprise specific features reported corresponding to a second profile configuration (e.g., the chirps 260a-260n that have the profile configuration 204j) The overlapped region 424 may comprise commonly reported features of both the first profile configuration and the second profile configuration. For example, the first profile configuration 420 may generally comprise different reported features from the second profile configuration 422 (e.g., the portions that do not overlap) and comprise common reported features with the second profile configuration 422 in the overlapped region 424.

The encoding control module 310 may be configured to generate two independent waveforms that may be interleaved (e.g., the subset of the chirps 260a-260n that have the profile configuration 204i and the subset of the chirps 260a-260n that have the profile configuration 204j) in the probe signals TX_I. The two independent waveforms may be configured to report two independent data sets of scene information of the environment 40 and/or the object 256. The encoding control module 310 may be configured to design the waveform such that some of the features are reported in exactly the same way for the two waveforms (e.g., reported in the common region 424) and some other of the features are reported differently (e.g., the portions of the first profile configuration 420 and the portion of the second profile configuration 422 not in the common region 424). Cross-checking based on the common region 424 may be performed by the centralized processing device 102 in order to resolve ambiguity. In one example, the feature analysis module 322 may be configured to compare and/or map various common features.

Generally, the centralized processing device 102 may be configured to interleave profile configurations 204a-204n in the probe signals TX_A-TX_N to enable at least one characteristic of the profile configurations 204a-204n (e.g., two different subset) to be different (e.g., as shown in association with FIG. 7) and one or more additional features reported in response to some of the profile configurations 204a-204n (e.g., from a same subset) to have different range bound values and one or more additional features reported in response to some of the profile configurations 204a-204n (e.g., a different subset) to have determined range bound values for the additional features reported. The centralized processing device 102 may be configured to resolve the range bound values for the additional features after cross checking using the determined range bound values of the common overlapped region 424. In one example, the encoding control module 310 may be configured to design the waveform with the profile configurations 204i-204j to enable a range reported by each of the subset of the chirps 260a-260n with the profile configuration 204i and the subset of the chirps 260a-260n with the profile configuration 204j for the target 256 to be constant for both (e.g., the range bound values reported by the frequency domain may be the same, while the Doppler and angle of arrival may have different unambiguous bounds). For example, if the target 256 has a known Doppler reported with a different level of ambiguity, the Doppler may be resolved after cross checking based on the common region 424.

The cross checking may be implemented with different profile configurations 204a-204n to resolve various ambiguities. In one example, if the characteristics of the profile configurations 204a-204n have different center frequencies Fc in different waveforms, the results reported may have different range bound values for maximum unambiguous Doppler and field of view for the angle of arrival. Cross checking different maximum Doppler bounds may resolve Doppler ambiguity and cross checking different fields of view may resolve angle of arrival ambiguity. In another example, if the characteristics of the profile configurations 204a-204n have different bandwidths BW in different waveforms, the results reported may yield different range resolution bound values. Cross checking different range resolution bounds may resolve range ambiguity.

Figure 9:
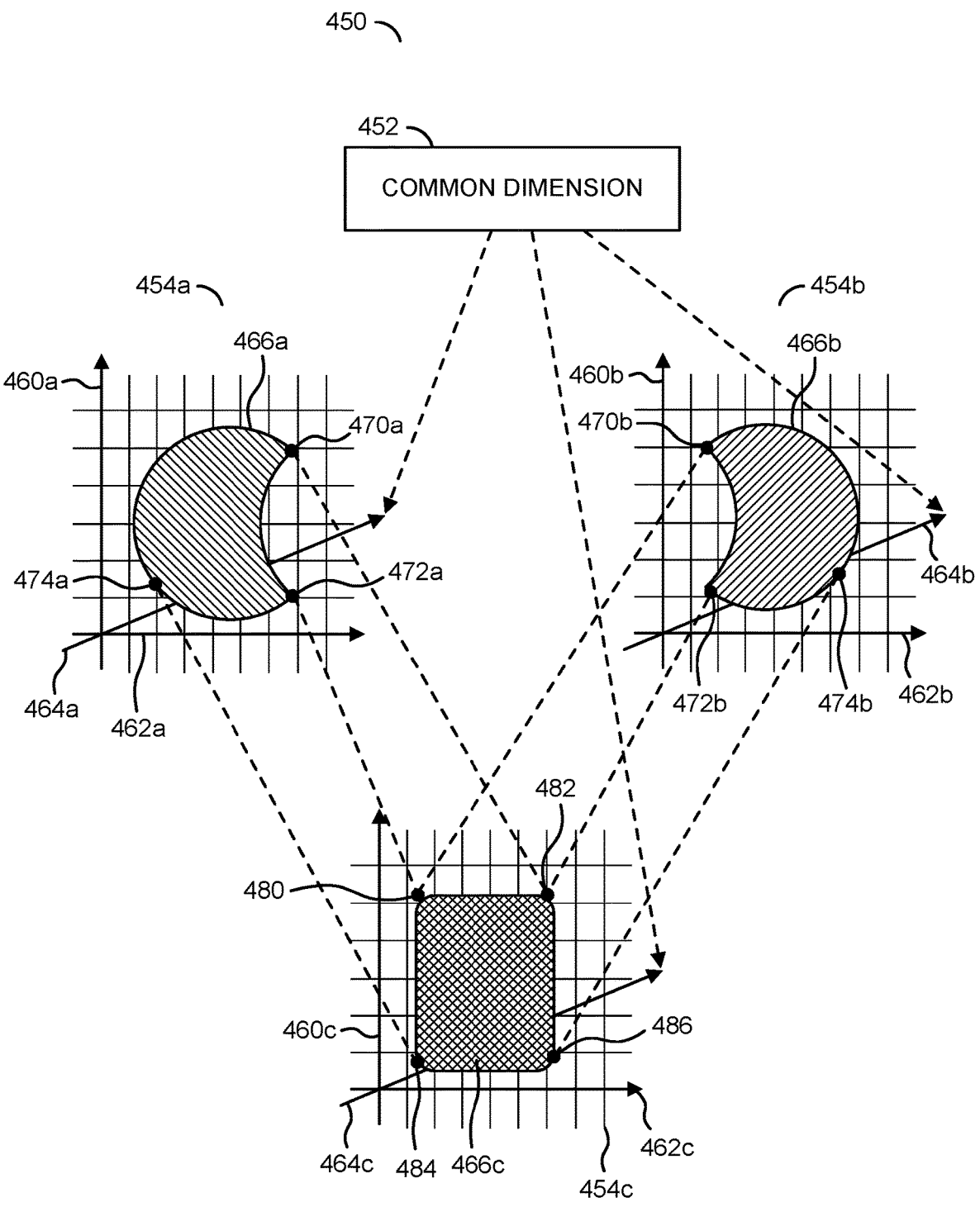
FIG. 9 is a diagram illustrating mapping parameters to a scale of a common dimension.

Referring to FIG. 9, a diagram illustrating mapping parameters to a scale of a common dimension is shown. A parameter resolution process 450 is shown. The parameter resolution process 450 may be configured to map uncommon features of data reported by the profile configurations 204a-204n of the interleaved radar data cube 202. The parameter resolution 450 may comprise a common dimension 452 and graphs 454a-454c.

After the common features of the profile configurations 204a-204n have been mapped (e.g., using the feature analysis module 322 as shown in association with FIG. 8), the centralized processing device 102 may be configured to adjust features with differences (e.g., uncommon features). The scaling and/or quantization module 314 and/or the inverse transformation module 324 may be configured to perform mathematical transformations on the uncommon features to bring the uncommon features into the common dimension 452. By bringing the uncommon features into the common dimension 452, the features may have a common scale as a reference in order to map the feature list between the profile configurations 204a-204n.

The graphs 454a-454c may each comprise respective axes 460a-460c, respective axes 462a-462c and respective axes 464a-464c. The axes 460a-460c may each be a Z-axis. The axes 462a-462c may each be an X-axis. The axes 464a-464c may each be a Y-axis. The Y-axes 464a-464c may have the common dimension 452. The graphs 454a-454c may each comprise a respective shape 466a-466c. The shape 466a may be uncommon features of a first profile configuration (e.g., the profile configuration 204i shown in association with FIGS. 7-8). The shape 466b may be uncommon features of a second profile configuration (e.g., the profile configuration 204j shown in association with FIGS. 7-8). The shape 466c may comprise a scaled feature list.

The uncommon feature 466a may comprise a point 470a, a point 472a and a point 474a. The uncommon feature 466b may comprise a point 470b, a point 472b and a point 474b. The scaling and/or quantization module 314 and/or the inverse transformation module 324 may be configured to map the feature list between the two profiles. The point 472a and the point 470b may be mapped to the point 480 on the scaled feature list 466c. The point 470a and the point 472b may be mapped to a point 482 on the scaled feature list 466c. The point 474a (e.g., without a corresponding point from the second profile configuration) may be mapped to a point 484 on the scaled feature list 466c. The point 464b (e.g., without a corresponding point from the first profile configuration) may be mapped to a point 486 on the scaled feature list 466c. Generally, the centralized processing device 102 may be configured to reconstruct the radar output in response to determining common mapped features from the profile configurations 204a-204n that have common features (e.g., as shown in association with FIG. 8), transforming the uncommon mapped features to the common dimension 452 and map the uncommon features between profile configurations based on a scale of the common dimension (e.g., the scaled feature list 466c).

Figures 10, 11:
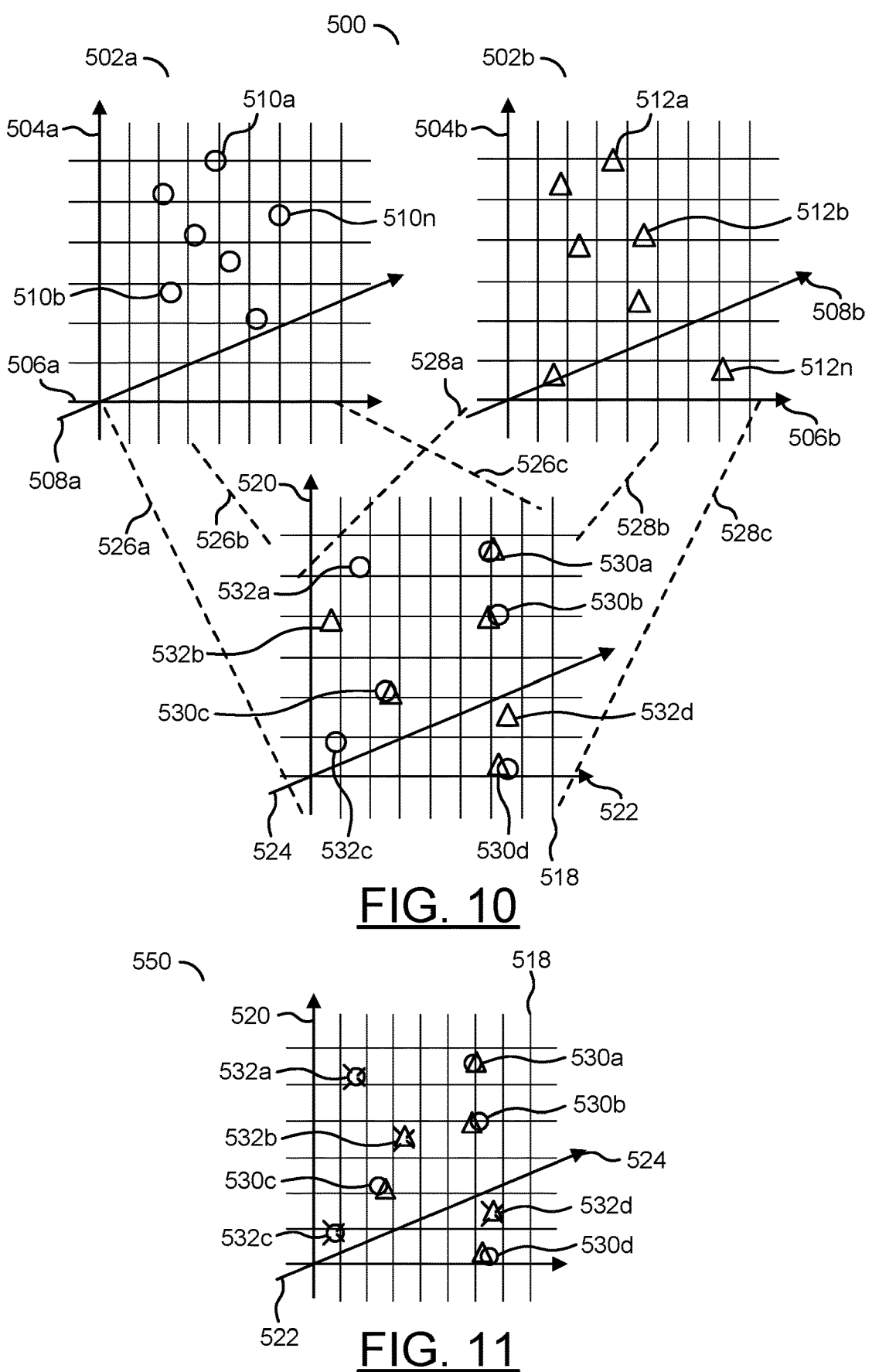
FIG. 10 is a diagram illustrating resolving ambiguities for coincident candidates in the common dimension.
FIG. 11 is a diagram illustrating removal of coincident candidates that correspond to noise.

Referring to FIG. 10, a diagram illustrating resolving ambiguities for coincident candidates in the common dimension is shown. A parameter resolution process 500 is shown. The parameter resolution process 500 may be configured to resolve ambiguities of data reported by the profile configurations 204a-204n of the interleaved radar data cube 202. The parameter resolution 500 may comprise graphs 502a-502b.

After the independent features of the profile configurations 204a-204n have been mapped to the same scale through transformation (e.g., using the scaling and/or quantization module 314 and/or the inverse transformation module 324 as shown in association with FIG. 9), the centralized processing device 102 may be configured to detect and/or determine coincident candidates. The intra-data prediction module 312 may be configured to resolve for the ambiguous dimensions of the data points that may be coincident candidates.

The graphs 502a-502b may each comprise respective axes 504a-504b, respective axes 506a-506b and respective axes 508a-508b. The axes 504a-504b may each be a Z-axis. The axes 506a-506b may each be an X-axis. The axes 508a-508b may each be a Y-axis.

A number of coincident candidates 510a-510n are shown on the graph 502a. The coincident candidates 510a-510n are shown as circular shapes for illustrative purposes. The coincident candidates 510a-510n may correspond to a first profile configuration (e.g., the profile configuration 204i shown in association with FIGS. 7-8).

A number of coincident candidates 512a-512n are shown on the graph 502b. The coincident candidates 512a-512n are shown as triangular shapes for illustrative purposes. The coincident candidates 512a-512n may correspond to a second profile configuration (e.g., the profile configuration 204j shown in association with FIGS. 7-8).

A graph 518 is shown. The graph 518 may comprise an axis 520, an axis 522, and an axis 524. The axis 520 may be a Z-axis. The axis 522 may be an X-axis. The axis 524 may be a Y-axis. Dashed lines 526a-526c are shown extending from the graph 502a to the graph 518. The dashed lines 526a-526c may represent mapping the coincident candidates 510a-510n to a common scale. Dashed lines 528a-528c are shown extending from the graph 502b to the graph 518. The dashed lines 528a-528c may represent mapping the coincident candidates 512a-512n to a common scale.

Data points 530a-530d and data points 532a-532d are shown on the graph 518. The data points 530a-530d and the data points 532a-532d may represent a result of the mapping of the coincident candidates 510a-510n and the coincident candidates 512a-512n to the graph 518 for analysis by the intra-data prediction module 312. The data points 530a-530d may each comprise an overlap of one of the coincident data points 510a-510n and one of the coincident data points 512a-512n (e.g., one from each of the two profile configurations). The data points 530a-530d may be resolved ambiguities. The resolved ambiguities 530a-530d may be resolved where one of the coincident candidates 510a-510n coincides with one of the coincident candidates 512a-512n. The data points 532a-532d may each comprise one of the coincident candidates 510a-510n or one of the coincident candidates 512a-512n (e.g., but not both). The data points 532a-532d may be unresolved data points. The unresolved data points 562a-562d may occur where the coincident candidates 510a-510n do not coincide with the coincident candidates 512a-512n. Generally, ambiguities may be resolved by the centralized processing device 102 in response to determining coincident candidates that map together to the scale of the common dimension.

Referring to FIG. 11, a diagram illustrating removal of coincident candidates that correspond to noise is shown. A parameter resolution process 550 is shown. The parameter resolution process 550 may be configured to perform noise removal of data reported by the profile configurations 204a-204n of the interleaved radar data cube 202. The parameter resolution 550 may comprise the graph 518.

The graph 518 is shown with the resolved data point features 530a-530d and the unresolved data points 532a-532d. The resolved data point features 530a-530d may be stored as data points that may be used to generate the high quality output data cube 302. The unresolved data points 532a-532d are shown with an X to represent that the unresolved data points 532a-532d may be discarded.

After the independent features of the profile configurations 204a-204n have been mapped to the same scale through transformation (e.g., using the scaling and/or quantization module 314 and/or the inverse transformation module 324 as shown in association with FIG. 9), the centralized processing device 102 may be configured to detect and/or determine coincident candidates. The intra-data prediction module 312 may be configured to resolve for the ambiguous dimensions based on the resolve data points 530a-530d. The filter control analysis module 326 may be configured to discard the unresolved data points 532a-532d (e.g., detections that did not find any commonality in the common space) as false positives.

In an example, both waveforms used in the profile configurations 204a-204n may have inherent noise characteristics. True positive results may be reported correctly in response to an analysis of both of the profile configurations. The noise may cancel out to be discarded. By discarding the noise and utilizing the resolved data point features 310a-310d, a higher confidence in the reported information about the target 256 may be determined. In the example parameter resolution process shown in association with FIGS. 7-11, the interleaved probe signal TX_I may comprise two of the profile configurations 204a-204n (e.g., the profile configuration 204i and the profile configuration 204j). In some embodiments, the probe signals TX_A-TX_N may comprise more than two of the profile configurations 204a-204n. A similar sequence of processing operations may be performed to resolve ambiguities for waveforms designed with more than two of the profile configurations 204a-204n.

In some embodiments, the filter control analysis module 326 may be configured to vary a processing function between different waveforms. Varying the processing function between different waveforms in the profile configurations 204a-204n may enable artificially created noise characteristics to be included in the probe signals. Since the artificially created noise characteristics are known when the encoding control module 310 generates the probe signals with the interleaved characteristic profiles 204a-204n, the centralized processing device 102 may use the previously determined artificial noise characteristic to aid in eliminating noise. For example, creating multiple noise characteristics may facilitate eliminating noise in the radar output 302.

Referring to FIG. 12, a method (or process) 600 is shown. The method 600 may resolve ambiguity across multiple radar measurement domains. The method 600 generally comprises a step (or state) 602, a step (or state) 604, a step (or state) 606, a step (or state) 608, a step (or state) 610, a step (or state) 612, a step (or state) 614, a decision step (or state) 616, and a step (or state) 618.

The step 602 may start the method 600. In the step 604, the centralized processing device may generate two or more of the profile configurations 204a-204n. The two or more of the profile configurations 204a-204n generated may comprise waveforms with pre-defined characteristics. Next, in the step 606, the centralized processing device 102 may interleave the profile configurations 204a-204n into one of the probe signals TX_A-TX_N. In one example, the encode control module 310 may interleave the profile configurations 204a-204n. In the step 608, the transmitters 140 of one of the radar frontends 110a-110n may transmit the probe signal (e.g., TX_A) to the environment 40. Next, the method 600 may move to the step 610.

In the step 610, the receivers 142 of one of the radar frontends 110a-110n may receive the raw radar data in the corresponding received signal (e.g., RX_A). In an example, the probe signal TX_A may be sent to the environment 40 and reflect off of the object 256 and the received signal RX_A may be the reflection of the probe signal TX_A. Next, in the step 612, the centralized processing device 102 may extract information (e.g., features) about the object 256 and/or other objects from the interleaved profile configurations 204a-204n in the interleaved data cube 202. For example, the centralized processing device 102 may process the raw radar data in the signal RX_A as an interleaved data cube 202 comprising the same profile configurations 204a-204n interleaved in the probe signal TX_A. In the step 614, the centralized processing device 102 may reconstruct a lossless high dynamic range radar output. For example, the radar output may be the signal FRAMEOUT. Next, the method 600 may move to the decision step 616.

In the decision step 616, the centralized processing device 102 may determine whether or not to change the profile configurations 204a-204n for a next one of the frames. In one example, the profile configurations 204a-204n may be selected according to a pre-determined sequence for the probe signals TX_A-TX_N. In another example, the centralized processing device 102 may select a set of profile configurations based on an analysis of the output of the previous frame. If the centralized processing device 102 determines not to change the set of profile configurations interleaved in the probe signals TX_A-TX_N for the next frame, then the method 600 may return to the step 608 (e.g., generate probe signals using the same set of profile configurations 204a-204n). If the centralized processing device 102 determines to change the profile configurations, then the method 600 may move to the step 618. In the step 618, the centralized processing device 102 may select a new set of profile configurations 204a-204n for the probe signals TX_A-TX_N. Next, the method 600 may return to the step 604.

Referring to FIG. 13, a method (or process) 650 is shown. The method 650 may independently resolve information from interleaved profile configurations received in a reflected probe signal. The method 650 generally comprises a step (or state) 652, a step (or state) 654, a step (or state) 656, a step (or state) 658, a step (or state) 660, a step (or state) 662, a step (or state) 664, a decision step (or state) 666, a step (or state) 668, a step (or state) 670, and a step (or state) 672.

The step 652 may start the method 650. In the step 654, the centralized processing device 102 may process information from two or more of the profile configurations 204a-204n independent from each other. For example, the interleaved data cube 202 may comprise interleaved profile configurations 204a-204n that correspond to the interleaved profile configurations 204a-204n in the probe signal TX_A that was reflected off the object 256 and received as the received signal RX_A. Processing the information from two or more of the profile configurations 204a-204n independent from each other may enable the inherent benefits of the particular waveform characteristics of each of the profile configurations 204a-204n to be preserved. Preserving the inherent benefits of the particular waveform characteristics of each of the profile configurations 204a-204n may enable the features captured at the same time for the same scenario to be resolved coherently. Next, the method 650 may move to the step 656.

In the step 656, the centralized processing device 102 may determine maximum unambiguous bounds of a feature reported from the different profile configurations 204a-204n interleaved in the same waveform. Next, in the step 658, the centralized processing device 102 may determine the common features 424 and uncommon features between the information extracted from the different profile configurations 204a-204n. In the step 660, the centralized processing device 102 may cross-check attributes (or features) to resolve different levels of ambiguities for the common features 424. Next, in the step 662, the scaling and/or quantization module 314 may transform the uncommon features (e.g., the uncommon features 466a-466b) to scale the dimensions to a common scale. In the step 664, the centralized processing device 102 may determine the coincident candidates 510a-510n and the coincident candidates 512a-512n of the independent features mapped to the common scale. Next, the method 650 may move to the decision step 666.

In the decision step 666, the centralized processing device 102 may determine whether there are more of the coincident candidates. If there are more of the coincident candidates, then the method 650 may move to the step 668. In the step 668, the centralized processing device 102 may resolve the ambiguous dimensions for the coincident candidate (or detect a false positive). Next, the method 650 may return to the decision step 666. In the decision step 666, if there are no more coincident candidates, then the method 650 may move to the step 670. In the step 670, the filter control analysis module 326 may determine the resolved data point features 530a-530d and filter out the noise 532a-532d. Next, the method 650 may move to the step 672. The step 672 may end the method 650.

Referring to FIG. 14, a method (or process) 700 is shown. The method 700 may filter noise in response to generating artificial noise characteristics. The method 700 generally comprises a step (or state) 702, a step (or state) 704, a step (or state) 706, a step (or state) 708, a step (or state) 710, a step (or state) 712, a step (or state) 714, a decision step (or state) 716, a step (or state) 718, a step (or state) 720, and a step (or state) 722.

The step 702 may start the method 700. In the step 704, the filter control analysis module 326 may determine different noise characteristics for multiple waveforms. Next, in the step 706, the filter control analysis module 326 may vary the processing for the waveforms (e.g., the profile configurations 204a-204n) in the different data frames using different noise characteristics to add artificial noise characteristics. In the step 708, the transmitters 140 may transmit the interleaved probe signals TX_A-TX_N with the artificial noise characteristics as part of the characteristics of the profile configurations 204a-204n. Next, in the step 710, the receivers 142 may receive the reflected signals RX_A-RX_N. Next, in the step 712, the centralized processing device 102 may independently analyze the interleaved profile configurations 204a-204n. In the step 714, the filter control analysis module 326 may detect noise in response to the artificial noise characteristics selected previously (e.g., in the step 704). Next, the method 700 may move to the decision step 716.

In the decision step 716, the filter control analysis module 326 may determine whether the coincident candidates have coincident detections. If the coincident candidates have a coincident detection, then the method 700 may move to the step 718. In the step 718, the centralized processing device 102 may resolve for the ambiguous dimensions of the features. Next, the method 700 may move to the step 722. In the decision step 716, if the coincident candidates do not have a coincident detection, then the method 700 may move to the step 720. In the step 720, the filter control analysis module 326 may filter the false positives out as noise. Next, the method 700 may move to the step 722. The step 722 may end the method 700.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s) The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to (i) present a probe signal and (ii) receive raw radar data generated in response to a reflection of said probe signal; and
a processor configured to (i) generate a plurality of profile configurations, (ii) interleave said plurality of profile configurations into said probe signal, (iii) present said probe signal to said interface, (iv) receive said raw radar data from said interface, (v) reconstruct a radar output based on said plurality of profile configurations in response to said raw radar data, and (vi) generate radar detections in response to said radar output, wherein
(a) interleaving said plurality of profile configurations into said probe signal enables said raw radar data to be received comprising information about an environment corresponding to each of said plurality of profile configurations at one time frame,
(b) interleaving said plurality of profile configurations enables said processor to extract said information about said environment corresponding to each of said plurality of profile configurations independent from each other,
(c) said radar output comprises said information about said environment, and
(d) said radar output is a lossless high dynamic range output.

2. The apparatus according to claim 1, wherein each of said plurality of profile configurations comprises a variation of frequency, phase, slope, gain, period, and sampling rate.

3. The apparatus according to claim 1, wherein interleaving said plurality of profile configurations into said probe signal enables said radar output to be generated without a coupling between maximum unambiguous Doppler, range resolution, angle ambiguity, maximum operational Range and processing gain.

4. The apparatus according to claim 1, wherein interleaving said plurality of profile configurations into said probe signal enables said processor to coherently resolve ambiguities across multiple domains.

5. The apparatus according to claim 1, wherein reconstructing said radar output based on said plurality of profile configurations enables preserving inherent benefits of each interleave sequence in said plurality of profile configurations.

6. The apparatus according to claim 1, wherein reconstructing said radar output comprises resolving ambiguities in said raw radar data.

7. The apparatus according to claim 6, wherein said ambiguities are resolved without adding latency and without errors.

8. The apparatus according to claim 1, wherein (i) interleaving said plurality of profile configurations enables processing an interleaved data cube comprising said plurality of profile configurations from said raw radar data and (ii) said plurality of profile configurations in said interleaved data cube comprise multiple representations of a single scenario in said environment.

9. The apparatus according to claim 1, wherein (i) said plurality of profile configurations each comprise different bandwidths and (ii) said different bandwidths enable said processor to resolve a difference in a maximum unambiguous range reported by each of said plurality of profile configurations.

10. The apparatus according to claim 1, wherein (i) said plurality of profile configurations each comprise a varying center frequency and (ii) said varying center frequency enables said processor to resolve a difference in a maximum unambiguous Doppler and field of view reported by each of said plurality of profile configurations.

11. The apparatus according to claim 1, wherein (i) said plurality of profile configurations each comprise a varying center frequency and a different bandwidth and (ii) said different bandwidth and said varying center frequency enables said processor to resolve a difference in a maximum unambiguous range, a maximum unambiguous Doppler and a field of view reported by each of said plurality of profile configurations.

12. The apparatus according to claim 1, wherein (i) said processor is configured to interleave said plurality of profile configurations to enable (a) a first characteristic of a first subset of said profile configurations and a second subset of said profile configurations to be different and one or more additional features reported in response to said first subset of said profile configurations to have different range bound values and (b) said one or more additional features reported in response to said second subset of said profile configurations to have determined range bound values, and (ii) said processor is configured to resolve said range bound values for said one or more additional features after cross checking using said determined range bound values.

13. The apparatus according to claim 12, wherein (i) said first characteristic comprises a center frequency, (ii) said one or more additional features comprise a Doppler and a field of view, (iii) cross checking said determined range bound values for said Doppler comprising different maximum Doppler bounds is configured to resolve said range bound values comprising Doppler ambiguity, and (iv) cross checking said determined range bound values for said field of view comprising angles of arrival is configured to resolve said range bound values comprising angle of arrival ambiguity.

14. The apparatus according to claim 12, wherein (i) said first characteristic comprises a bandwidth, (ii) said one or more additional features comprise a range resolution and (iii) cross checking said determined range bound values comprising range resolution bounds is configured to resolve said range bound values comprising range ambiguity.

15. The apparatus according to claim 1, wherein said processor is configured to reconstruct said radar output in response to (i) determining common mapped features from said plurality of profile configurations that have common features, (ii) transforming uncommon mapped features to a common dimension and (iii) mapping said uncommon features between said plurality of profile configurations based on a scale of said common dimension.

16. The apparatus according to claim 15, wherein (i) ambiguities are resolved by said processor in response to determining coincident candidates mapped to said scale of said common dimension, (ii) said coincident candidates that can be resolved for said ambiguities are stored as data points for said radar output and (ii) said coincident candidates that cannot be resolved for said ambiguities are discarded.

17. The apparatus according to claim 1, wherein (i) said processor is configured to generate said plurality of profile configurations to create multiple noise characteristics and (ii) creating said multiple noise characteristics facilitates eliminating noise in said radar output.

18. The apparatus according to claim 1, wherein said apparatus is configured to resolve ambiguity across multiple radar measurement domains.

19. An apparatus comprising:

an interface configured to (i) present a probe signal and (ii) receive raw radar data generated in response to a reflection of said probe signal; and a processor configured to (i) generate a plurality of profile configurations, (ii) interleave said plurality of profile configurations into said probe signal, (iii) present said probe signal to said interface, (iv) receive said raw radar data from said interface, and (v) reconstruct a radar output based on said plurality of profile configurations in response to said raw radar data, and (vi) generate radar detections in response to said radar output, wherein (a) interleaving said plurality of profile configurations into said probe signal enables said raw radar data to be received comprising information about an environment corresponding to each of said plurality of profile configurations at one time frame, (b) interleaving said plurality of profile configurations enables said processor to extract said information about said environment corresponding to each of said plurality of profile configurations independent from each other, and (c) said radar output comprises said information about said environment, and (d) interleaving said plurality of profile configurations into said probe signal enables said processor to coherently resolve ambiguities across multiple domains.

20. An apparatus comprising:

an interface configured to (i) present a probe signal and (ii) receive raw radar data generated in response to a reflection of said probe signal; and a processor configured to (i) generate a plurality of profile configurations, (ii) interleave said plurality of profile configurations into said probe signal, (iii) present said probe signal to said interface, (iv) receive said raw radar data from said interface, and (v) reconstruct a radar output based on said plurality of profile configurations in response to said raw radar data, and (vi) generate radar detections in response to said radar output, wherein (a) interleaving said plurality of profile configurations into said probe signal enables said raw radar data to be received comprising information about an environment corresponding to each of said plurality of profile configurations at one time frame, (b) interleaving said plurality of profile configurations enables said processor to extract said information about said environment corresponding to each of said plurality of profile configurations independent from each other, and (c) said radar output comprises said information about said environment, and (d) reconstructing said radar output based on said plurality of profile configurations enables preserving inherent benefits of each interleave sequence in said plurality of profile configurations.

* * * * *